US012658797B2

(12) United States Patent (10) Patent No.: US 12,658,797 B2
Yang et al. (45) Date of Patent: *Jun. 16, 2026

(54) POWER CONVERTER INTEGRATED CIRCUIT

(71) Applicant: Cirrus Logic International Semiconductor Ltd., Edinburgh (GB)

(72) Inventors: Seunguk Yang, Gyeonggi-do (KR); Sangkoo Yoon, Seoul (KR); Sungdae Choi, Seoul (KR); Sehyung Jeon, Seoul (KR)

(73) Assignee: Cirrus Logic Inc., Austin, TX (US)

( * ) Notice: Subject to any disclaimer, the term of this patent is extended or adjusted under 35 U.S.C. 154(b) by 314 days.

This patent is subject to a terminal disclaimer.

(21) Appl. No.: 18/184,733

(22) Filed: Mar. 16, 2023

(65) Prior Publication Data

US 2024/0313650 A1 Sep. 19, 2024

(51) Int. Cl.
H02M 3/07 (2006.01)
H02M 1/00 (2006.01)
H02M 3/158 (2006.01)

(52) U.S. Cl.
CPC ......... *H02M 3/158* (2013.01); *H02M 1/0095* (2021.05); *H02M 3/07* (2013.01)

(58) Field of Classification Search
CPC ............................................. H02M 3/07–078
See application file for complete search history.

(56) References Cited

U.S. PATENT DOCUMENTS

| | | | | |
|---|---|---|---|---|
| 2020/0212704 A1* | 7/2020 | Eftimie | ................... | H02M 3/07 |
| 2021/0399627 A1* | 12/2021 | Fukasawa | ........... | H02M 7/4835 |
| 2022/0181973 A1 | 6/2022 | Huang et al. | | |
| 2023/0216413 A1* | 7/2023 | Kumar | .................. | H02M 1/143 |
| | | | | 323/272 |

FOREIGN PATENT DOCUMENTS

WO 2017156638 A1 9/2017

OTHER PUBLICATIONS

Combined Search and Examination Report under Sections 17 and 18(3), UKIPO, Application No. GB2400660.3, dated Dec. 4, 2024.

* cited by examiner

*Primary Examiner* — Peter M Novak
(74) *Attorney, Agent, or Firm* — Jackson Walker L.L.P.

(57) ABSTRACT
A power converter integrated circuit comprising a switch network having coupling nodes for coupling the switch network to a single flying capacitor, an output capacitor, and an inductor; wherein the power converter integrated circuit is operable in a first forward mode as switched capacitor power converter circuitry and in a second forward mode as inductive converter circuitry, wherein in the first forward mode, the switch network is operative to couple the single flying capacitor and the output capacitor in series in a first phase of operation, and couple the single flying capacitor and the output capacitor in parallel in a second phase of operation; and in the second forward mode, the switch network is operative to couple the single flying capacitor, the inductor and the output capacitor in series in a phase of operation, and couple a series combination of the single flying capacitor and the inductor in parallel with the output capacitor in a subsequent phase of operation.

20 Claims, 25 Drawing Sheets

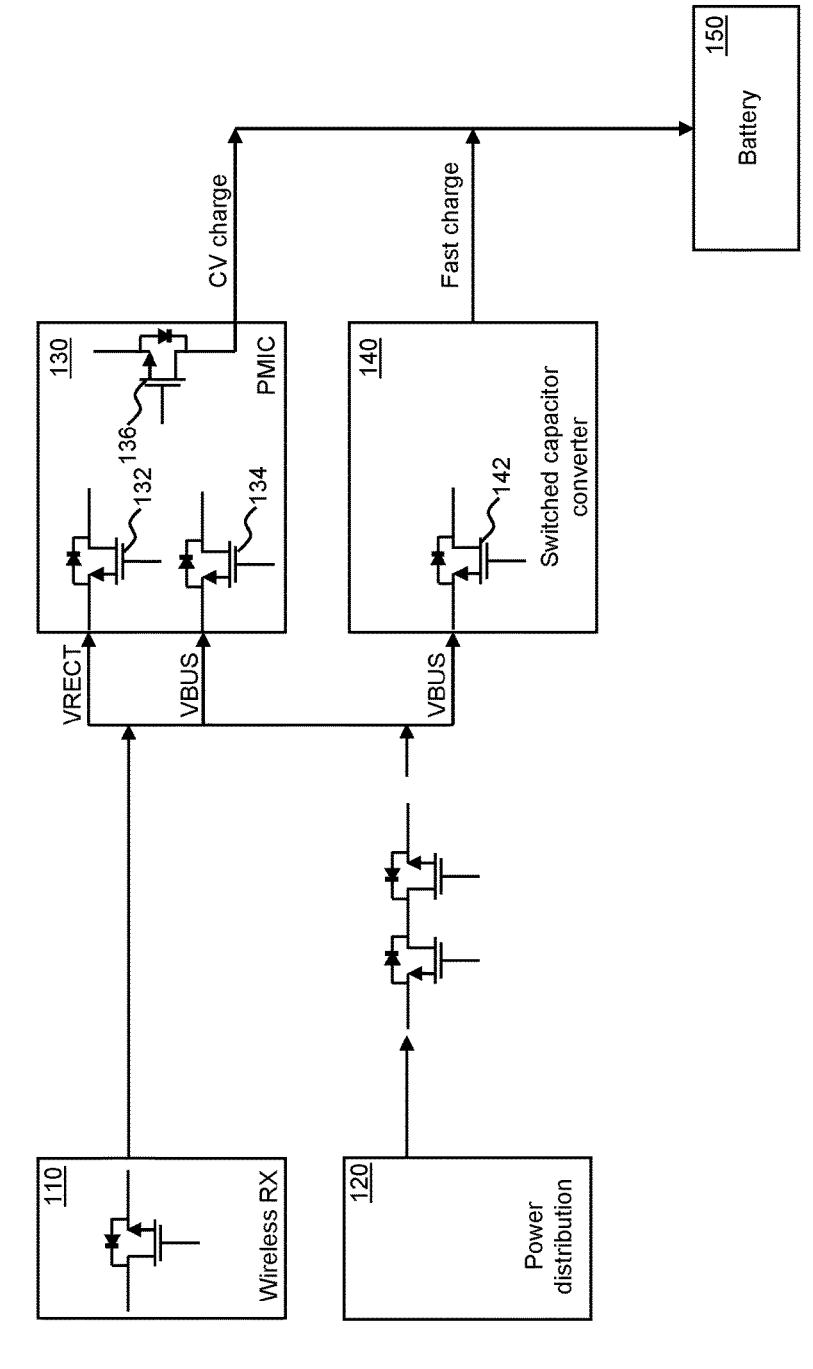

444/446/
452/454

444a/446a/
452a/454a

444b/446b/
452b/454b

POWER CONVERTER INTEGRATED CIRCUIT

FIELD OF THE INVENTION

The present disclosure relates to a power converter integrated circuit, and in particular to a power converter integrated circuit for use in a battery charging system of a portable electronic device.

BACKGROUND

Portable electronic devices such as smartphones, tablet and laptop computers are typically powered by a rechargeable battery or battery pack. Such devices typically also include charging circuitry for charging the battery or battery pack from an external power supply such as a USB (Universal Serial Bus) charging device or a mains adapter that converts a mains AC voltage from a domestic electrical outlet to a DC voltage that can be used by the charging circuitry.

An increasing number of such portable electronic devices support wireless charging, i.e. the ability to charge the device battery or battery pack from an external supply without requiring a physical (e.g. plug and socket) connection between the device and an external power supply. In such devices power can be transferred to the device from a wireless charger (e.g. a mat or pad) by means of inductive coupling between a transmitting coil of the wireless charger and a coil of the charging circuitry of the device.

Some such devices also support "reverse wireless charging", which is the ability of the device to transfer electrical power to another device without requiring a physical connection between the power-supplying device and the power-receiving device. In such devices this transfer of power is typically achieved by means of inductive coupling between a coil of the power-supplying device and a coil of the charging circuitry of the power-receiving device. As will be appreciated, in devices that support reverse wireless charging, the coil of the charging circuitry is used as a receiving coil to receive power from a charger when the device is being charged, and is used as transmitting coil to transmit power when the device is transferring power to another device.

SUMMARY

According to a first aspect, the invention provides a power converter integrated circuit comprising: a switch network having coupling nodes for coupling the switch network to: a single flying capacitor; an output capacitor; and an inductor, wherein the power converter integrated circuit is operable in a first forward mode as switched capacitor power converter circuitry and in a second forward mode as inductive converter circuitry, wherein: in the first forward mode, the switch network is operative to: couple the single flying capacitor and the output capacitor in series in a first phase of operation; and couple the single flying capacitor and the output capacitor in parallel in a second phase of operation; and in the second forward mode, the switch network is operative to: couple the single flying capacitor, the inductor and the output capacitor in series in a phase of operation; and couple a series combination of the single flying capacitor and the inductor in parallel with the output capacitor in a subsequent phase of operation.

The switch network may be operable with a duty cycle of less than 0.5 in the second forward mode.

The switch network may be operative to couple the inductor in parallel with the output capacitor in a further phase of operation.

The switch network may be operable with a duty cycle greater than 0.5 in the second forward mode.

The switch network may be operative to couple the inductor in series with the output capacitor in a further phase of operation.

The switch network may be operable with a fixed duty cycle of 0.5 in the first forward mode.

The power converter integrated circuit may be operable in a first reverse mode as switched capacitor converter circuitry and in a second reverse mode as inductive boost converter circuitry.

In operation of the power converter integrated circuit in the first reverse mode, the switch network may be operative to: couple the flying capacitor and the output capacitor in parallel in a first phase of operation; and couple the flying capacitor and the output capacitor in series in a second phase of operation.

In operation of the power converter integrated circuit in the first reverse mode, the switch network may be operative to: couple the flying capacitor and the output capacitor in parallel between an output node of the power converter integrated circuit and a reference voltage supply node in the first phase of operation; and couple the flying capacitor between the output node and an input node of the power converter integrated circuitry and couple the output capacitor between the output node and the reference voltage supply node in the second phase of operation.

The switch network may be operable with a fixed duty cycle of 0.5 in the first reverse mode.

In operation of the power converter integrated circuit in the second reverse mode, the switch network may be operative to: couple a series combination of the flying capacitor and the inductor in parallel with the output capacitor in a phase of operation; and couple the output capacitor, the inductor and the flying capacitor in series in a subsequent phase of operation.

The switch network may be operable with a duty cycle of less than 0.5 in the second reverse mode.

The switch network may be operative to couple the inductor in parallel with the output capacitor in a subsequent phase of operation.

The switch network may be operable with a duty cycle greater than 0.5 in the second reverse mode.

The switch network may be operative to couple the inductor in series with the output capacitor in a subsequent phase of operation.

The switch network may comprises first to sixth switches, and, in use of the power converter integrated circuit: the first switch may be coupled between a reference voltage supply node of the switch network and the second switch; the second switch may be coupled between the first switch and the third switch; the third switch may be coupled between the second switch and the fourth switch; the fourth switch may be coupled between the third switch and a switch network input node; the fifth switch may be coupled between the first switch network node and a first terminal of the inductor; the sixth switch may be coupled between the second switch network node and the first terminal of the inductor; a second terminal of the inductor may be coupled to an output node of the power converter integrated circuit; the output capacitor may be coupled to the output node of the power converter integrated circuit; a first terminal of the flying capacitor may be coupled to a first switch network node between the third and fourth switches; and a second terminal of the flying capacitor may be coupled to a second switch network node between the first and second switches.

The second switch and/or the third switch and/or the fifth switch and/or the sixth switch may comprise a first MOSFET device and a second MOSFET device, wherein a source terminal of the first MOSFET device is coupled to a source terminal of the second MOSFET device such that an anode of a body diode of the first MOSFET device is coupled to an anode of a body diode of the second MOSFET device.

The power converter integrated circuit may further comprise an input switch coupled between an input node of the power converter integrated circuit and the fourth switch.

According to a second aspect, the invention provides power converter circuitry comprising switched capacitor power converter circuitry and inductive buck or inductive boost converter circuitry, the power converter circuitry comprising: a switch network configured to be coupled, in use of the power converter circuitry to: a single flying capacitor; an output capacitor; and an inductor, wherein, in use of the power converter circuitry, the switch network, the single flying capacitor and the output capacitor are common to both the switched capacitor power converter circuitry and the inductive buck or inductive boost converter circuitry.

According to a third aspect, the invention provides a battery charging system comprising the power converter integrated circuit of the first aspect.

According to a fourth aspect, the invention provides a host device comprising the power converter integrated circuit of the first aspect or the power converter circuitry of the third aspect.

The host device may comprise, for example, a laptop, notebook, netbook or tablet computer, a gaming device, a games console, a controller for a games console, a virtual reality (VR) or augmented reality (AR) device, a mobile telephone, a portable audio player, a portable device, an accessory device for use with a laptop, notebook, netbook or tablet computer, a gaming device, a games console, a VR or AR device, a mobile telephone, a portable audio player or other portable device.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the invention will now be described, strictly by way of example only, with reference to the accompanying drawings, of which:

FIG. 1a is a schematic representation of a charging system of a portable electronic device;

FIG. 1b is a schematic representation of switched capacitor converter circuitry suitable for use in the charging system of FIG. 1a;

FIG. 1c is a schematic representation of inductive buck converter circuitry suitable for use in the charging system of FIG. 1a;

DETAILED DESCRIPTION

Figure 1B:
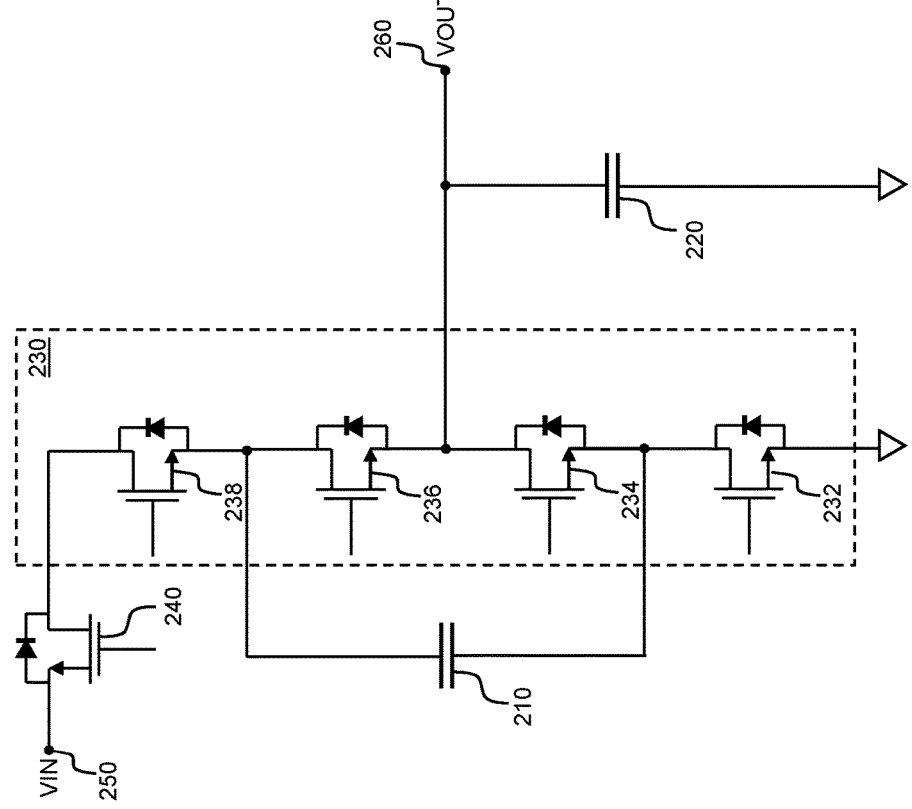
Figure 1B:

A common strategy for charging a battery or battery pack (hereinafter referred to as a battery, for conciseness) in a portable electronic device uses two distinct stages. In a first stage a fast charging approach is used, in which a constant voltage is supplied to the battery to charge it until a first threshold battery voltage or state of charge is reached. When the threshold battery voltage or state of charge has been reached, the first stage ends, and a second stage commences. In the second stage a constant voltage-constant current (CC-CV) approach is used, in which a constant voltage and a constant current are supplied to the battery to charge it, until a second threshold battery voltage or state of charge is reached, at which point the charging process ends.

To implement a two-stage charging strategy of this kind, the charging circuitry of the device typically includes switched capacitor power converter circuitry to generate the constant voltage required for the first, fast charging stage, and inductive buck converter circuitry to generate the constant voltage and constant current required for the second, CC-CV charging stage.

FIG. 1a is a schematic diagram illustrating an example charging system having charging circuitry including switched-capacitor power converter circuitry and inductive buck converter circuitry.

The charging system in this example (shown generally at 100 in FIG. 1a) includes wireless power receiving circuitry 110, which is configured to receive power from a wireless charging device such as a charging pad, mat or the like, and to output a rectified voltage VRECT. The rectified voltage VRECT may have a magnitude of the order of 15V DC, for example.

The charging system 100 further includes power distribution circuitry 120 configured to receive power from an external source such as a USB (Universal Serial Bus) interface and to output a DC bus voltage VBUS. The DC bus voltage VBUS may have a magnitude of the order of 15V, for example.

The charging system 100 further includes a power management integrated circuit (PMIC) 130, which implements 2-level or 3-level inductive buck converter circuitry for converting the rectified voltage VRECT and the DC bus voltage VBUS to a lower voltage magnitude (e.g. 5V) suitable for charging a battery 150 in a constant voltage-constant current (CC-CV) charging mode. 3-level inductive buck converter circuitry is generally more efficient than 2-level inductive buck converter circuitry, and may thus be preferred for use in the charging system 100 of FIG. 1*a*.

The PMIC 130 includes a first leakage blocking transistor 132, which in the illustrated example is a MOSFET device having a body diode that blocks reverse current flow from the PMIC 130 to the wireless power receiving circuitry 110. The PMIC 130 further includes a second leakage blocking transistor 134, which in the illustrated example is a MOS-FET device having a body diode that blocks reverse current flow from the PMIC 130 to the power distribution circuitry 120. The first and second leakage blocking transistors 132, 134 thus prevent discharge of the battery 150 into the wireless power receiving circuitry 110 or the power distribution circuitry 120.

The PMIC 130 further includes a battery controller transistor 136 (which in the illustrated example is a MOSFET device) which is turned on when the charging system 100 is operating in the CC-CV charging mode to allow current flow from the PMIC 130 to the battery 150. This has the effect of reducing the efficiency of the inductive buck converter circuitry implemented by the PMIC, because some power is dissipated as heat in the on-resistance (e.g. the drain to source resistance) of the battery controller transistor 136.

The charging system 100 further includes switched capacitor power converter circuitry 140 configured to convert the rectified voltage VRECT and the DC bus voltage VBUS to a lower voltage magnitude (e.g. 5V) suitable for charging the battery 150 in a fast charging mode. In contrast to the PMIC 130, in use of the charging system 100, an output node of the switched capacitor power converter circuitry 140 is coupled directly to the battery 150, to prevent unnecessary power losses (as heat) arising from the on resistance (e.g. the drain to source resistance) of the battery controller transistor 136.

The switched capacitor power converter circuitry 140 includes a leakage blocking transistor 142, which in the illustrated example is a MOSFET device having a body device that blocks reverse current flow from the switched capacitor power converter circuitry 140 to the wireless power receiving circuitry 110 and the power distribution circuitry 120, thus preventing discharge of the battery 150 into the wireless power receiving circuitry 110 or the power distribution circuitry 120.

In use, the charging system 100 initially operates in a fast charging mode in which the battery 150 is charged to a first predetermined threshold level (e.g. 80% or 85% of its nominal or rated terminal voltage) by the switched capacitor power converter circuitry 140.

When the battery has reached the first predetermined threshold level, the charging system 100 switches into a CC-CV mode in which the switched capacitor power converter circuitry 140 is turned off or disabled and the PMIC 130 supplies a constant current and constant voltage to the battery 150, via the battery controller transistor 136 (which is turned on).

When the battery 150 has reached a second predefined threshold level (e.g. when the battery 150 has reached its nominal or rated terminal voltage) the battery controller transistor 136 is turned off, such that the PMIC 130 can no longer supply a charging current to the battery 150. Thus, charging of the battery 150 stops.

When the battery 150 is not being charged, leakage from the battery 150 to the wireless power receiving circuitry 110 and/or the power distribution circuitry 120 is prevented by the leakage blocking transistors 132, 134, 142.

The wireless power receiving circuitry 110 includes a coil for wirelessly receiving power from the wireless charging device (charging pad, mat or the like). As will be appreciated, a temperature of the coil is related to the current flowing through it. Thus, to avoid excessive heat dissipation in the coil (which could adversely affect the performance, stability or safety of the battery 150), the current flowing through the coil should be minimised. To achieve this, the switched capacitor power converter circuitry 140 may have a relatively high input voltage to output voltage ratio.

However, the use of a relatively high input voltage to output voltage ratio in the switched capacitor power converter circuitry 140 in the charging system 100 of FIG. 1 prevents integration of the switched capacitor power converter circuitry 140 and the PMIC 130 in a single integrated circuit. Thus, in a typical charging system of the kind shown in FIG. 1, the PMIC 130 and the switched capacitor power converter circuitry 140 are implemented as separate integrated circuits.

FIG. 1*b* is a schematic diagram illustrating switched capacitor power converter circuitry suitable for use as the switched capacitor power converter circuitry 140 in the charging system 100 of FIG. 1*a*.

The switched capacitor power converter circuitry, shown generally at 200 in FIG. 1*b*, includes a flying capacitor 210, an output capacitor 220, a switch network 230 and an input switch 240.

The switch network comprises, in this example, first to fourth switches 232-238 (which in this example are MOS-FET devices), which can be selectively opened and closed to couple the flying capacitor 210 to an input node 250 and an output node 260 of the switched capacitor power converter circuitry 200 to generate an output voltage VOUT at a desired magnitude from an input voltage VIN.

The input switch 240 (which in this example is a MOS-FET device) is operable to activate and deactivate the switched capacitor power converter circuitry 200 by selectively coupling the switch network 230 to, and decoupling the switch network 230 from, the input node 250 at which the input voltage VIN is received.

In this example the switched capacitor power converter circuitry 200 is operable with an input voltage to output voltage ratio of 2:1, such that the magnitude of the output voltage VOUT is one half of the magnitude of the input voltage.

As can be seen from FIG. 1*b*, in this example the switched capacitor power converter circuitry 200 includes five switches (switches 232-238 of the switch network) for coupling the flying capacitor 210 to the input and output nodes 250, 260, a further switch (input switch 240) for controlling an operational state (activated/deactivated) of the switched capacitor power converter circuitry 200, and two capacitor (flying capacitor 210 and output capacitor 220).

Figure 1C:
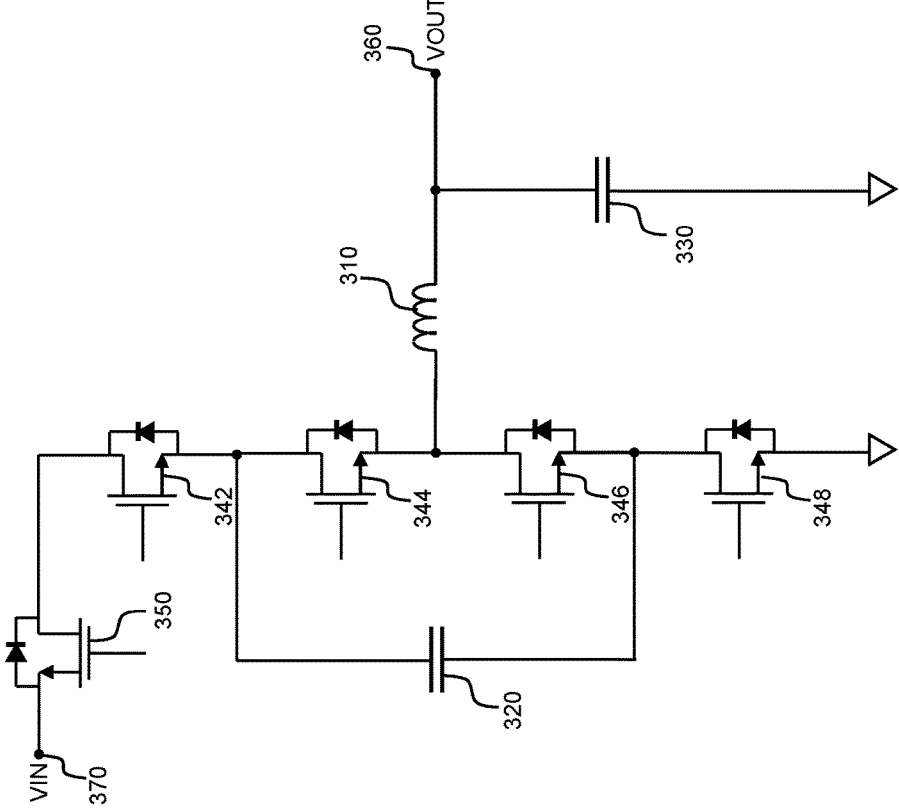
Figure 1C:
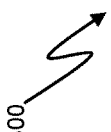

FIG. 1*c* is a schematic diagram illustrating inductive buck converter circuitry suitable for use as the inductive buck converter circuitry implemented by the PMIC 130 in the system of FIG. 1*a*.

The inductive buck converter circuitry, shown generally at 300 in FIG. 1*c*, includes an inductor 310, a flying capacitor 320 and an output capacitor 330. The inductive buck converter circuitry 300 further includes a switch network comprising, in this example, first to fourth switches 342-348 (which in this example are MOSFET devices) for selectively coupling the inductor 310 to the flying capacitor 320 or to an output node 360 of the inductive buck converter circuitry 300. The inductive buck converter circuitry 300 also includes an input switch 350 (which in this example is a MOSFET device) that is operable to activate and deactivate the inductive buck converter circuitry 300 by selectively coupling the first switch 342 to, and decoupling the first switch 342 from, an input node 370 at which the input voltage VIN is received.

As can be seen from FIG. 1c, in this example the inductive buck converter circuitry 300 includes four switches (switches 342-348 of the switch network) for coupling the inductor 310 to the flying capacitor 320 or the output node 360, a further switch (input switch 350) for controlling an operational state (activated/deactivated) of the inductive buck converter circuitry 300, and two capacitors (flying capacitor 320 and output capacitor 330).

Although not shown in FIG. 1c, as those of ordinary skill in the art will be aware, the inductive buck converter circuitry 300 also requires additional control circuitry to ensure that the voltage of the flying capacitor 320 remains balanced.

Thus, in a charging system of the kind shown in FIG. 1 in which the PMIC 130 and the switched capacitor power converter circuitry 140 are provided as separate circuits, a total of thirteen switches and five capacitors are required to implement the inductive buck converter circuitry and the switched capacitor power converter circuitry 140.

Figure 2:
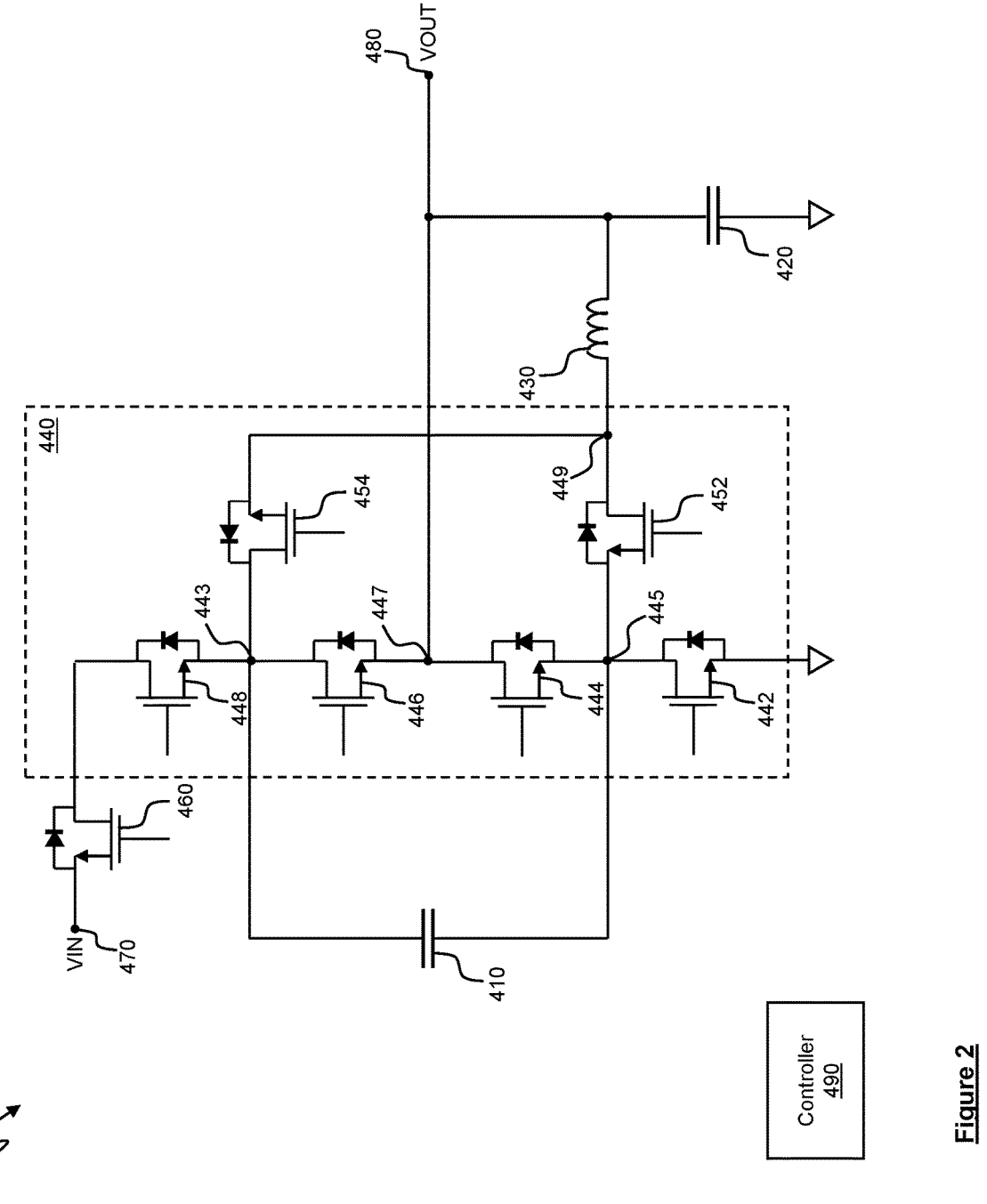
FIG. 2 is a schematic representation of power converter circuitry according to the present disclosure.

FIG. 2 is a schematic representation of power converter circuitry according to the present disclosure, which combines inductive buck converter circuitry and switched capacitor power converter circuitry into a single circuit. The power converter circuitry of the present disclosure may thus be referred to as a combined power converter circuit (or combined power converter circuitry).

The power converter circuitry, shown generally at 400 in FIG. 2, is operable in a first forward mode as switched capacitor converter circuitry and in a second forward mode as inductive buck converter circuitry. In the first and second forward modes, the power converter circuitry 400 is operative to step down an input voltage to generate an output voltage.

The power converter circuitry 400 is also operable in a first reverse mode as switched capacitor power converter circuitry, and in a second reverse mode as inductive boost converter circuitry. In the first and second reverse modes, the power converter circuitry 400 is operative to step up an input voltage to generate an output voltage.

The power converter circuitry 400 in the illustrated example includes a flying capacitor 410, an output capacitor 420 (which may be of equal capacitance to the flying capacitor 410), and an inductor 430.

The power converter circuitry 400 further includes a switch network 440 configured to be coupled to the flying capacitor 410, the output capacitor 420 and the inductor 430. An input switch 460, which in this example is a MOSFET device, is coupled between an input node 470 at which an input voltage VIN is received and the switch network 440, and is operable to activate and deactivate the power converter circuitry 400 by selectively coupling the switch network 440 to, and decoupling the switch network 440 from, the input node 470. An output voltage VOUT is provided at an output node 480 of the power converter circuitry 400.

The power converter circuitry 400 further includes controller circuitry 490, which is configured to control operation of the switch network 440 to cause the power converter circuitry 400 to operate in a desired mode, as described in more detail below. The controller circuitry 490 may be implemented in discrete circuitry or integrated circuitry, or may be implemented by a microprocessor, microcontroller, state machine or the like, executing suitable instructions.

The power converter circuitry 400 may be said to comprise switched capacitor power converter circuitry and inductive buck or boost converter circuitry, with the switch network 440, the single flying capacitor 410 and the output capacitor 420 being common to or shared by the switched capacitor power converter circuitry and the inductive buck or boost converter circuitry.

In some examples, the power converter circuitry 400 is implemented in a single integrated circuit. In such examples, the flying capacitor 410, the output capacitor 420, the inductor 430, the switch network 440, the input switch 460 and the controller circuitry 490 are provided as part of the integrated circuit, i.e. are provided on-chip.

In other examples, the flying capacitor 410, output capacitor 420 and inductor 430 may be provided externally of the integrated circuit (i.e. off-chip), and the switch network 440, the input switch 460 and the controller circuitry 490 may be implemented in a single integrated circuit. In such examples, the integrated circuit may comprise a first set of one or more terminals (pins, pads, balls or the like) by means of which an external (i.e. off-chip) flying capacitor 410 can be coupled to a first set of one or more coupling nodes of the switch network 440. Similarly, the integrated circuit may comprise a second set of one or more terminals (pins, pads, balls or the like) by means of which an external (i.e. off-chip) output capacitor 420 can be coupled to a second set of one or more coupling nodes of the switch network 440, and a third set of one or more terminals (pins, pads, balls or the like) by means of which an external (i.e. off-chip) inductor 430 can be coupled to a third set of one or more coupling nodes of the switch network 440. The coupling nodes of the switch network 440 are described in more detail below.

The switch network 440 in the illustrated example comprises first to fourth switches 442-448 (which in this example are MOSFET devices) coupled in series between a ground (or other reference voltage) terminal or coupling node and the input switch 460, as shown in FIG. 2.

In use of the power converter circuitry 400, a first terminal of the flying capacitor 410 is coupled to a first node 443 of the switch network 440, between the fourth switch 448 and the third switch 446. A second terminal of the flying capacitor 410 is coupled to a second node 445 of the switch network 440, between the second switch 444 and the first switch 442. Thus, the first node 443 and the second node 445 of the switch network 440 constitute a set of coupling nodes for the flying capacitor 410.

The output node 480 is coupled to a third node 447 of the switch network, between the second switch 444 and the third switch 446.

The switch network 440 further includes a fifth switch 452 (which is a MOSFET device, in the illustrated example) coupled between the second node 445 and a fourth node 449 which, in use of the power converter circuitry 400, is coupled to a first terminal of the inductor 430. The fourth node 449 thus constitutes a first coupling node for the inductor 430.

The switch network further includes a sixth switch 454 (which is also a MOSFET device, in the illustrated example) coupled between the first node 443 and the fourth node 449.

In use of the power converter circuitry 400, a first terminal of the output capacitor 420 and a second terminal of the inductor 430 are coupled to the third node 447 (which is in turn coupled to the output node 480). A second terminal of the output capacitor 420 is coupled to the ground (or other reference voltage) terminal or coupling node. The third node 447 thus constitutes a second coupling node for the inductor 430 and a first coupling node for the output capacitor 420.

Thus, as will be appreciated, the combination of the first to fourth switches 442-448, the flying capacitor 410 and the output capacitor 420 of the power converter circuitry 400 constitutes switched capacitor power converter circuitry, and the combination of the switch network 440, the flying capacitor 410, the output capacitor 420 and the inductor 430 constitutes inductive buck or boost converter circuitry. Thus, the power converter circuitry 400 may be said to comprise switched capacitor power converter circuitry and inductive buck or boost converter circuitry, with the switch network, the flying capacitor 410 and the output capacitor 420 being common to or shared by the switched capacitor power converter circuitry and the inductive buck or boost converter circuitry.

As will be apparent from FIG. 2, the power converter circuitry 400 in the example illustrated in FIG. 2 includes a total of seven switches (although in some examples there may only be six switches, as the input switch 460 may be omitted, e.g. if a back-to-back switch is used, externally of the power converter circuitry 400, in an input signal path to the input node 470), one capacitor and one inductor. In contrast, in the charging system 100 of FIG. 1 in which the inductive buck converter circuitry implemented by the PMIC and the switched capacitor power converter circuitry 140 are provided as separate circuits, a total of ten switches and four capacitors are required to implement the inductive buck converter circuitry and the switched capacitor power converter circuitry 140. Thus, the power converter circuitry 400 of FIG. 2 requires three fewer switches and three fewer capacitors than the charging system 100 of FIG. 1*a*.

In the example shown in FIG. 2, the switches 442-454 of the switch network 440 are shown as being implemented by single MOSFET devices. However, in some implementations, the second switch 444, and/or the third switch 446 and/or the fifth switch 452 and/or the sixth switch 454 may be implemented as two back-to-back connected MOSFET devices, as shown in FIG. 3.

Figure 3:
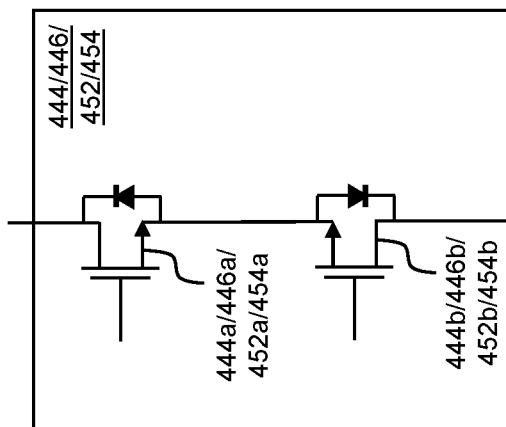
FIG. 3 illustrates switch arrangements for one or more of the switches of the power converter circuitry of FIG. 2 when the circuitry is used as a forward 3-level inductive buck converter.

As shown in FIG. 3, the second switch 444 may be implemented by a combination of a first MOSFET device 444*a* and a second MOSFET device 444*b*, with source terminals of the first and second MOSFET devices 444*a*, 444*b* being coupled together such that, in the illustrated example, an anode of a body diode of the first MOSFET device 444*a* is coupled to an anode of a body diode of the second MOSFET device 444*a*. The third switch 446 and/or the fifth switch 452 may be implemented by a similarly connected combination of a first MOSFET device and a second MOSFET device 462*b* As will be appreciated by those of ordinary skill in the art, in other examples the first and second MOSFET devices 444*a* and 444*b* may be connected so that the direction of the body diodes are reversed, in comparison with the example of FIG. 3, according to the structure of the gate driver for driving the switches.

As noted above, the power converter circuitry 400 is operable in a first forward mode as switched capacitor power converter circuitry and in a second forward mode as inductive buck converter circuitry. The power converter circuitry is also operable in a first reverse mode as switched capacitor power converter circuitry, and in a second reverse mode as inductive boost converter circuitry.

When operating in the first forward mode as switched capacitor power converter circuitry, the power converter circuitry 400 operates as a forward switched capacitor power converter with a 2:1 input voltage to output voltage ratio to supply power to a component coupled to its output node 480, e.g. to supply power to charge a battery. Thus, when operating in the first forward mode (i.e. in a forward switched capacitor converter mode), the power converter circuitry is operative to generate the output voltage VOUT by applying a substantially integer step-down conversion factor (i.e. the input voltage VIN is an integer multiple of the output voltage VOUT) to the input voltage VIN.

When operating in the second forward mode as inductive buck converter circuitry, the power converter circuitry 400 operates as a forward 3-level inductive buck converter to supply power to a component coupled to its output node 480, e.g. to supply power to charge a battery. Thus, when operating in the second forward mode (i.e. in an inductive buck converter mode), the power converter circuitry is operative to generate the output voltage VOUT by applying a substantially non-integer step-down conversion factor (i.e. the input voltage VIN is a non-integer multiple of the output voltage VOUT) to the input voltage VIN.

When operating in the first reverse mode as switched capacitor power converter circuitry, the power converter circuitry 400 operates as a reverse switched capacitor power converter with a 1:2 input voltage to output voltage ratio, to supply power from a component such as a battery coupled to its output node 480 to a component or subsystem (e.g. a wireless charging subsystem or a power supply subsystem that is coupled to the power converter circuitry by means of a USB cable or the like) coupled to its input node 470. Thus, when operating in the first reverse mode (i.e. in a reverse switched capacitor converter mode), the power converter circuitry is operative to generate the output voltage VOUT by applying a substantially integer step-up conversion factor (i.e. the output voltage VOUT is an integer multiple of the input voltage VIN) to the input voltage VIN.

When operating in the second reverse mode as inductive boost converter circuitry, the power converter circuitry 400 operates as reverse 3-level inductive boost converter to supply power from a component such as a battery coupled to its output node 480 to a component or subsystem (e.g. a wireless charging subsystem or a power supply subsystem that is coupled to the power converter circuitry by means of a USB cable or the like) coupled to its input node 470. Thus, when operating in the second reverse mode (i.e. in an inductive boost converter mode), the power converter circuitry is operative to generate the output voltage VOUT by applying a non-integer step-up conversion factor (i.e. the output voltage VOUT is a non-integer multiple of the input voltage VIN) to the input voltage VIN.

The ability of the power converter circuitry 400 to apply a substantially integer step-down or step-up conversion factor to the input voltage VIN (when operating in the first forward mode and the first reverse mode, respectively) and to apply a non-integer step-down or step up conversion factor to the input voltage VIN (when operating in the second forward mode or the second reverse mode, respectively) allows selection between coarse control of the output voltage VOUT (in the first mode) and finer control of the output voltage VOUT (in the second mode) as required by the application in which the circuitry 400 is used. For example, in a battery charger application, coarse control of the output voltage VOUT (as provided by the power converter circuitry 400 in its first mode) may be sufficient for the first, fast charging stage, whereas in the second, CC-CV stage, finer control of the output voltage VOUT (as provided by the power converter circuitry 400 in its second mode) may be required.

Figure 4A:
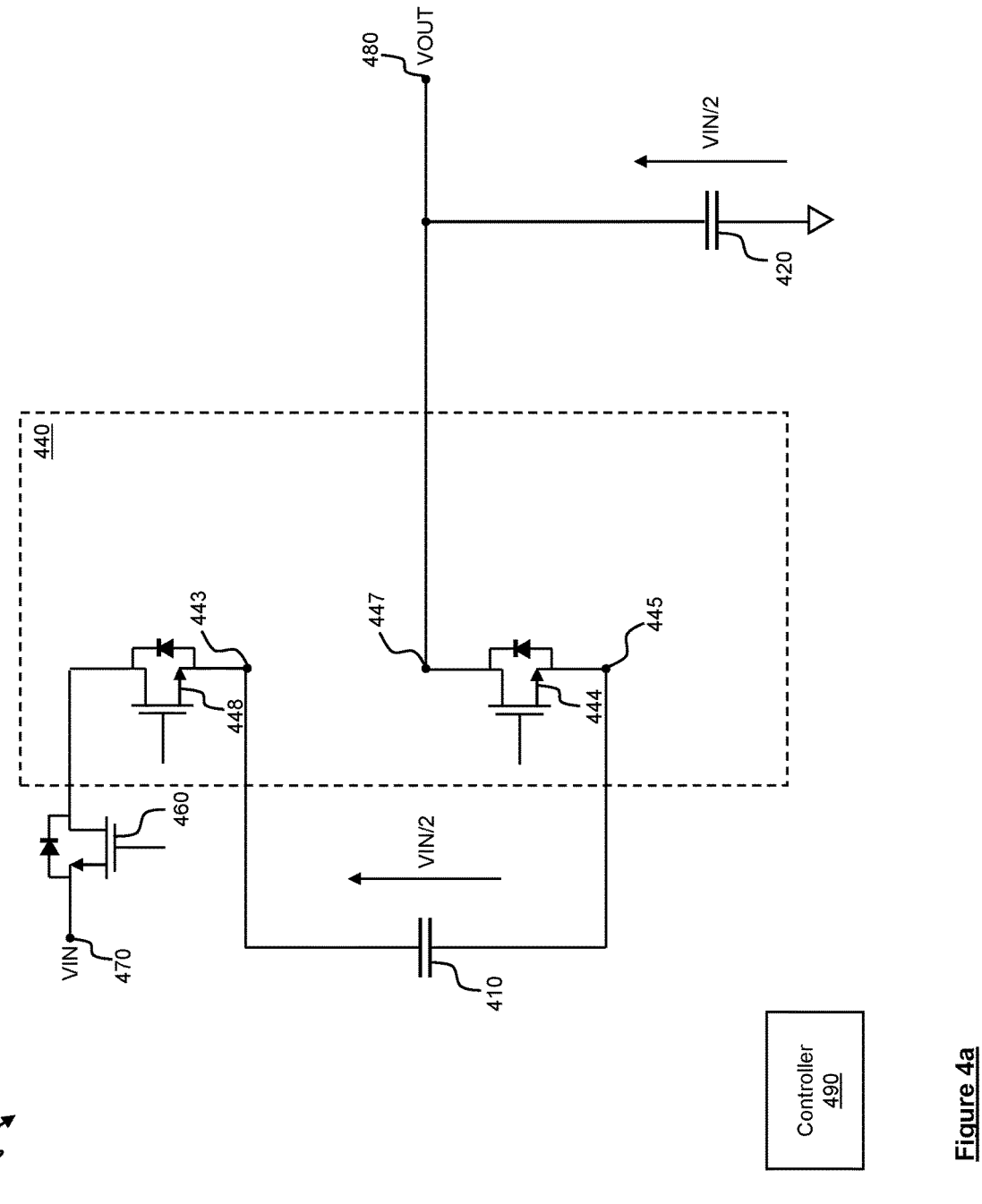
FIGS. 4a-4b illustrate operation of the circuitry of FIG. 2 as a forward switched capacitor power converter with a 2:1 input voltage to output voltage ratio.
Figure 4B:
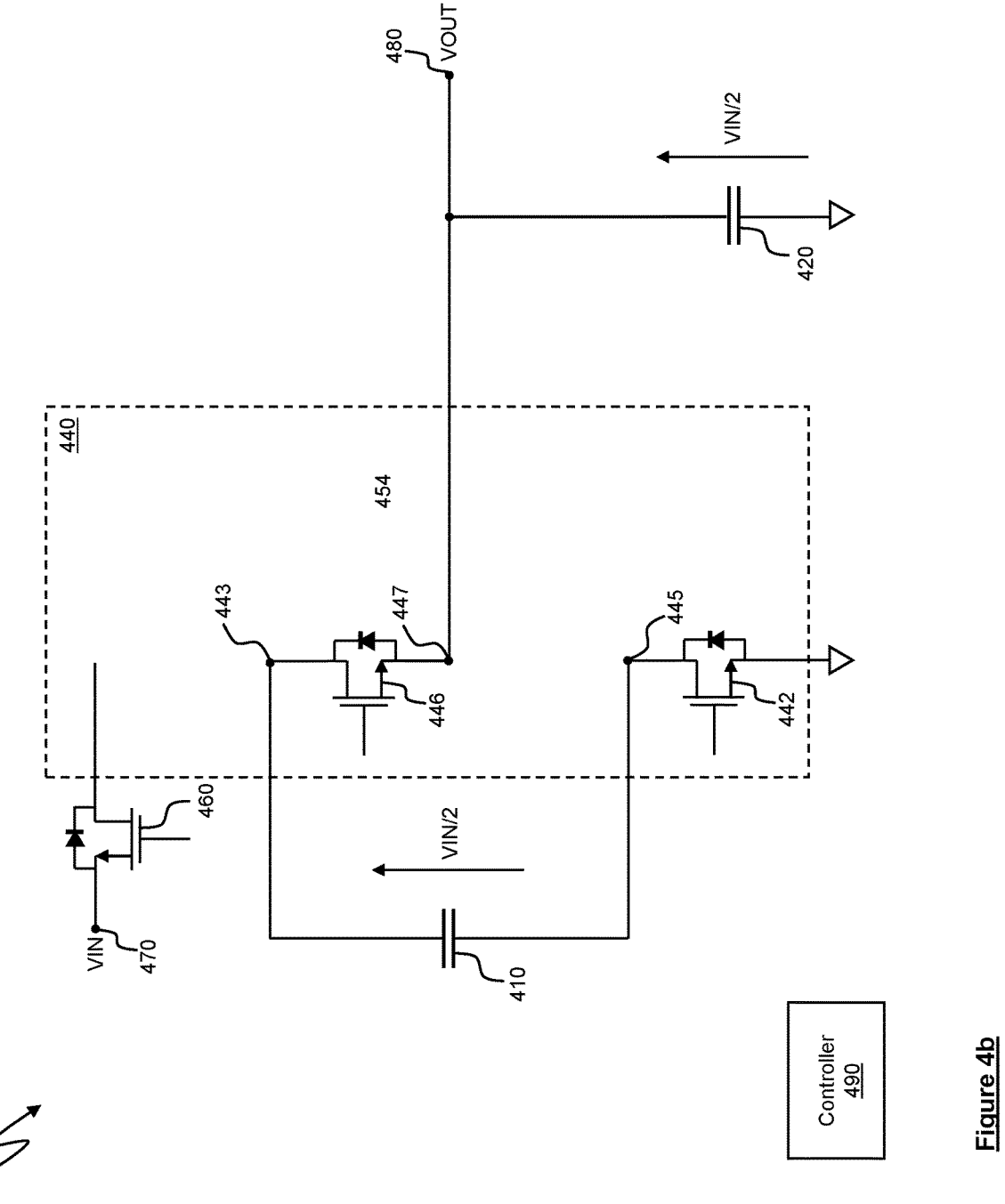

FIGS. 4*a* and 4*b* are schematic diagrams illustrating operation of the power converter circuitry 400 in the first forward mode, as switched capacitor power converter circuitry with a 2:1 input voltage to output voltage ratio, i.e. a step-down conversion factor of 2.

In a first phase of operation, shown in FIG. 4a, the input switch 460 and the second and fourth switches 444, 448 of the switch network 440 are closed (i.e. switched on) in response to suitable control signals from the controller circuitry 490. The other switches 442, 446, 452 and 454 are opened (i.e. switched off) in response to suitable control signals from the controller circuitry 490 (and are thus not shown in FIG. 4a).

With the switch network 440 in this configuration, the flying capacitor 410 and the output capacitor 420 are coupled in series between the input node 470 and the ground (or other reference voltage) supply terminal or coupling node, and the output node 480 is coupled to the third node 447, which is between the series-coupled flying capacitor 410 and output capacitor 420. Thus, if the flying capacitor 410 and the output capacitor 420 are of equal capacitance, a voltage of VIN/2 develops across each of the flying capacitor 410 and the output capacitor 420. The flying capacitor 410 and the output capacitor 420 thus charge up to VIN/2, and the output voltage VOUT is equal to VIN/2.

In a second phase of operation, shown in FIG. 4b, the second and fourth switches 442, 446 are opened (i.e. switched off) in response to suitable control signals from the controller circuitry 490 (and are thus not shown in FIG. 4b). The first and third switches 442, 446 are closed (i.e. switched on), in response to suitable control signals from the controller circuitry 490, such that the flying capacitor 410 and the output capacitor 420 are coupled in parallel between the output node 480 and the ground (or other reference voltage supply) terminal or coupling node.

Thus, in the second phase of operation, the peak output voltage VOUT is equal to the voltage that developed across the flying capacitor 410 and the output capacitor 420 during the first phase, and so the peak output voltage VOUT in the second phase of operation is VIN/2.

In operation of the power converter circuitry 400 in the first forward mode as switched capacitor power converter circuitry, a duty cycle of the power converter circuitry is fixed at 0.5, such that the duration of the first phase is equal to half of a total duration of the first and second phases. As a result of this fixed duty cycle, the voltage across the flying capacitor 410 is maintained at VIN/2, so there is no need for additional circuitry for balancing the voltage of the flying capacitor 410.

FIGS. 5a-5d are schematic diagrams illustrating operation of the power converter circuitry 400 in the second forward mode, as three-level inductive buck converter circuitry with a duty cycle D of less than 0.5. In this mode the power converter circuitry may apply a non-integer step-down conversion factor to the input voltage VIN to generate the output voltage VOUT.

For inductive buck converter circuitry, the duty cycle is defined as the ratio of the on-time of the switch(es) that control a supply of current to the inductor 430 to the total duration of an operational cycle of the inductive buck converter circuitry. Thus, for a duty cycle of less than 0.5, the on-time of the switch(es) that control the supply of current to the inductor 430 is less than half the total duration of an operational cycle of the inductive buck converter circuitry. The duty cycle defines a relationship between the output voltage VOUT and the input voltage VIN of the inductive buck converter circuitry, as D=VOUT/VIN. Thus, when the duty cycle D is less than 0.5, the output voltage VOUT is less than half of VIN.

Figure 5A:
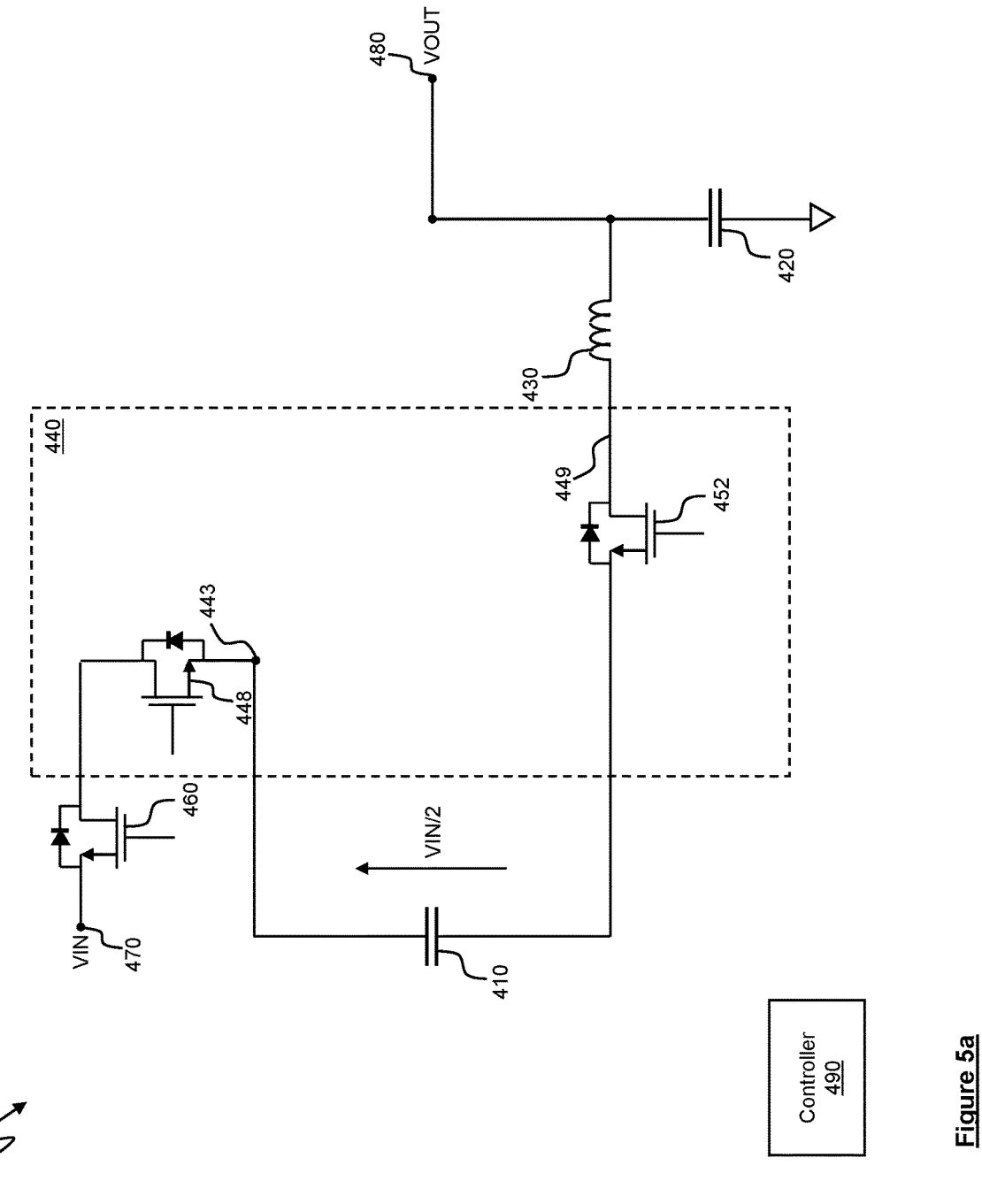
FIGS. 5a-5d illustrate operation of the circuitry of FIG. 2 as a forward three-level inductive buck converter with a duty cycle of less than 0.5.

In a first phase of operation, shown in FIG. 5a, the input switch 460 and the fourth and fifth switches 448, 452 of the switch network 440 are closed (i.e. switched on) in response to suitable control signals from the controller circuitry 490. The other switches 442, 444, 446 and 454 are opened (i.e. switched off) in response to suitable control signals from the controller circuitry 490 (and are thus not shown in FIG. 5a).

With the switch network 440 in this configuration, the flying capacitor 410, the inductor 430 and the output capacitor 420 are coupled in series between the input node 470 and the ground (or other reference voltage) supply terminal or node, and the output node 480 is coupled to the second terminal of the inductor 430 and the first terminal of the output capacitor 420. Thus, with the switch network 440 in this configuration, the flying capacitor 410 and the inductor 430 are coupled in series between the input node 470 and the output node 480.

In the first phase of operation the flying capacitor 410 charges up and a voltage of (or close to) VIN/2 develops across the flying capacitor 410. As the first terminal of the inductor 430 is coupled to the flying capacitor 410, and as the output voltage VOUT is less than VIN/2 (because the duty cycle is less than 0.5), the voltage (VIN/2) at the first terminal of the inductor 430 is greater than the voltage at the second terminal of the inductor 430. Current through the inductor 430 thus increases and flows to a load (e.g. a battery 150) coupled to the output node 480, and to the output capacitor 420. A voltage VOUT, which is less than VIN/2 (because the voltage across the output capacitor 420 cannot increase instantaneously and because the inductor 430 limits the charging current that is supplied to the output capacitor 420), develops at the output node 480.

It will be noted that no separate flying capacitor is required when the power converter circuitry 400 operates in its second forward mode as three-level inductive buck converter circuitry, because the flying capacitor 410 that is used when the power converter circuitry 400 is operating in its first forward mode as switched capacitor power converter circuitry is also used when the power converter circuitry 400 is operating in its second mode as three-level inductive buck converter circuitry.

Figure 5B:
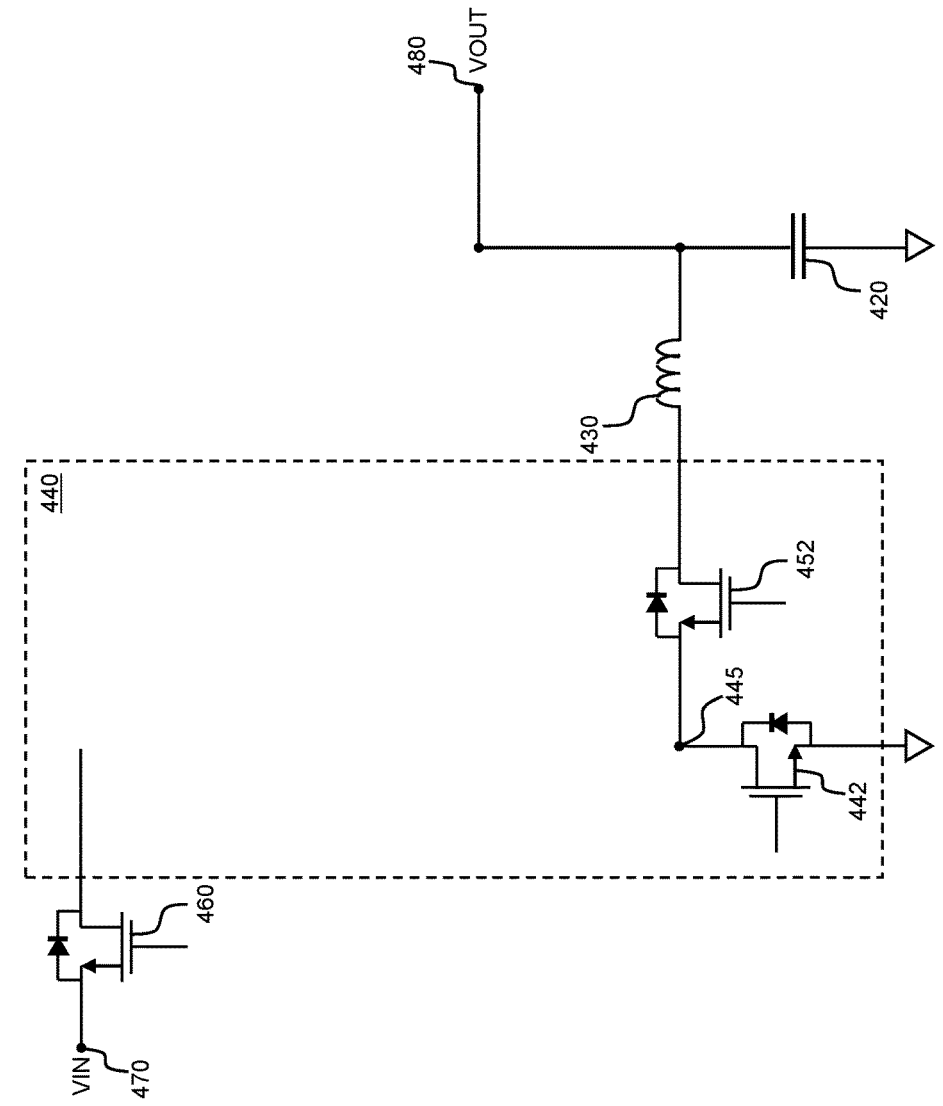
Figure 5B:
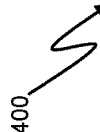

In a second phase of operation, shown in FIG. 5b, the first and fifth switches 442, 452 of the switch network 440 are closed (i.e. switched on) in response to suitable control signals from the controller circuitry 490. The other switches 444-448 and 454 are opened (i.e. switched off) in response to suitable control signals from the controller circuitry 490 (and are thus not shown in FIG. 5b).

With the switch network 440 in this configuration, the inductor 430 and output capacitor 420 are coupled in parallel between the ground (or other reference voltage) terminal or coupling node and the output node 480. Thus, in the second phase of operation the inductor 430 receives no input voltage. The current through the inductor 430 thus decreases, flowing to the load that is coupled to the output node 480. The output capacitor 420 also discharges into the load during this phase, such that the total current supplied to the load is the sum of the inductor current and the output capacitor current. The output voltage VOUT in this second phase of operation is again less than VIN/2.

Figure 5C:
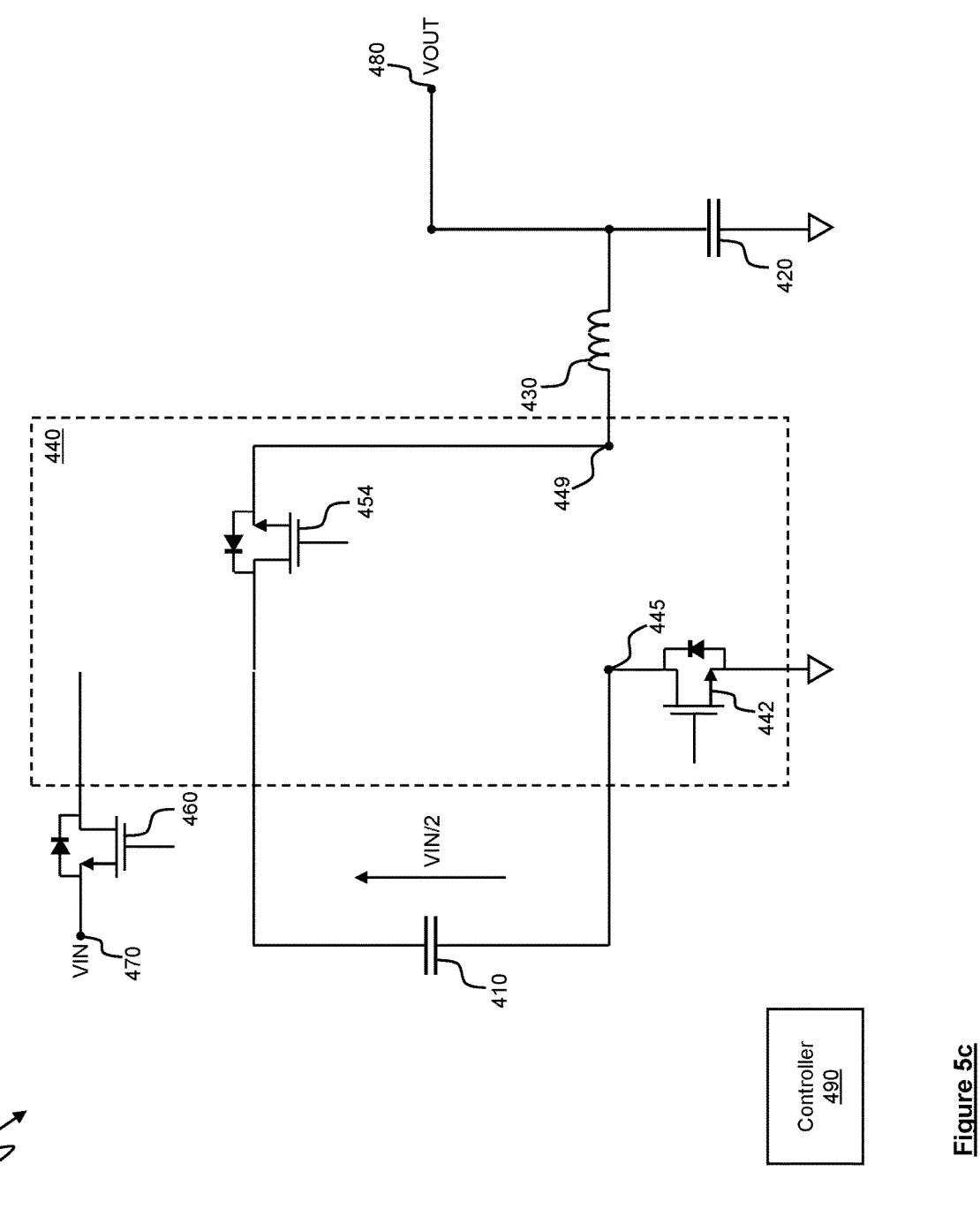

In a third phase of operation, shown in FIG. 5c, the first and sixth switches 442, 454 of the switch network 440 are closed (i.e. switched on) in response to suitable control signals from the controller circuitry 490. The other switches 444-448 and 452 are opened (i.e. switched off) in response to suitable control signals from the controller circuitry 490 (and are thus not shown in FIG. 5c).

With the switch network 440 in this configuration, the flying capacitor 410 and the inductor 430 are coupled in series between the ground (or other reference voltage) terminal or coupling node and the output node 480, and the output capacitor 420 is coupled between the output node 480 and the ground (or other reference voltage) terminal or coupling node.

Thus, in the third phase of operation, the series combination of the flying capacitor 410 and the inductor 430 is coupled in parallel with the output capacitor 420. The voltage VIN/2 across the flying capacitor 410 is thus supplied to the inductor 430, causing current through the inductor 430 to increase again, charging the output capacitor 420 and supplying the load that is coupled to the output node with a voltage VOUT, which is smaller than VIN/2.

Figure 5D:
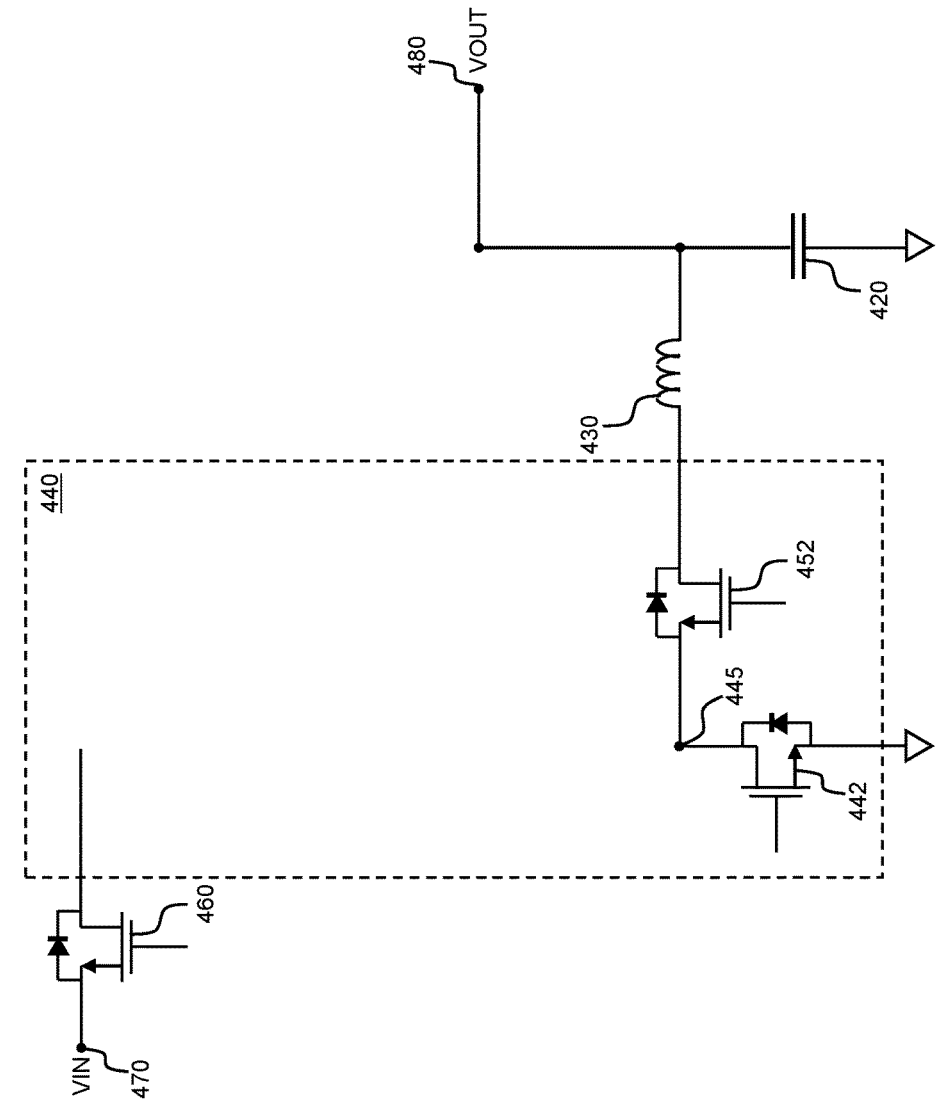
Figure 5D:
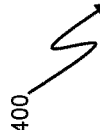

In a fourth phase of operation, shown in FIG. 5d, the first and fifth switches 442, 452 of the switch network 440 are again closed (i.e. switched on) in response to suitable control signals from the controller circuitry 490. The other switches 444-448 and 454 are opened (i.e. switched off) in response to suitable control signals from the controller circuitry 490 (and are thus not shown in FIG. 5d). Thus, in the fourth phase of operation the switch network 440 adopts the same configuration as in the second phase of operation.

With the switch network 440 in this configuration, the inductor 430 and output capacitor 420 are again coupled in parallel between the ground (or other reference voltage) terminal or coupling node and the output node 480, such that the current through the inductor 430 again decreases, flowing to the load that is coupled to the output node 480. The output capacitor 420 also discharges into the load during this phase, such that the total current supplied to the load is the sum of the inductor current and the output capacitor current. The output voltage VOUT in this fourth phase of operation is again less than VIN/2.

As will be appreciated by those of ordinary skill in the art, over a complete operational cycle (where a complete operational cycle comprises the first to fourth phases of operation) of the power converter circuitry 400 when operating in its second forward mode as forward three-level inductive buck converter circuitry with a duty cycle less than 0.5, the average output voltage VOUT will be less than VIN/2.

FIGS. 6a-6d are schematic diagrams illustrating operation of the power converter circuitry 400 in the second forward mode, as three-level inductive buck converter circuitry with a duty cycle greater than 0.5, such that the output voltage VOUT is greater than half the input voltage VIN. In this mode the power converter circuitry may apply a non-integer step-down conversion factor to the input voltage VIN to generate the output voltage VOUT.

If the power converter circuitry 400 is to be operated in the second forward mode as a three-level buck converter with a duty cycle greater than 0.5, the third switch 446 should be implemented as two back-to-back connected MOSFET devices, as shown in FIG. 3, to prevent reverse current flow from a load such as a battery that is coupled to the output node 480, as will be explained in more detail below.

Figure 6A:
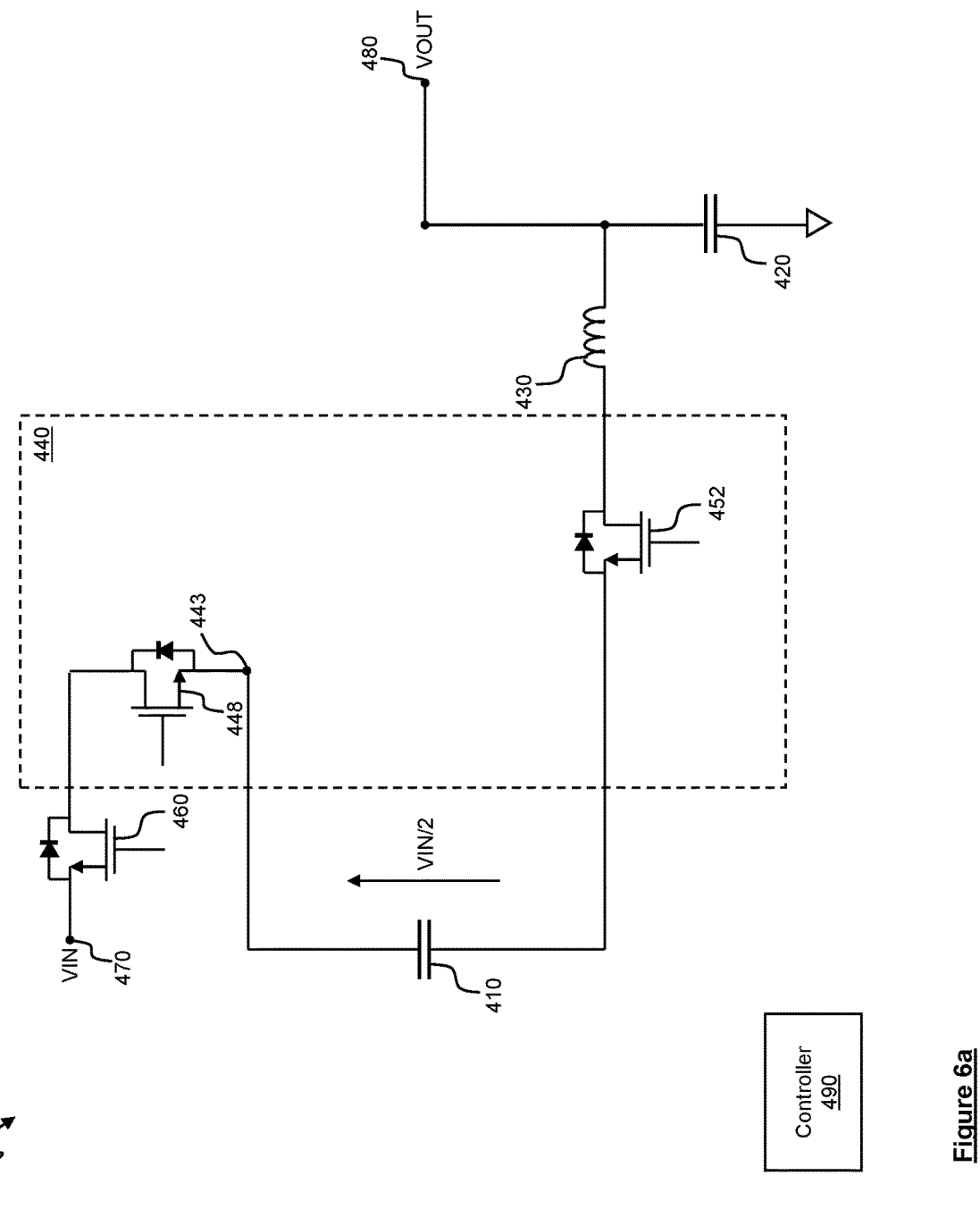
FIGS. 6a-6d illustrate operation of the circuitry of FIG. 2 as a forward three-level inductive buck converter with a duty cycle greater than 0.5.

In a first phase of operation, shown in FIG. 6a, the switch network 440 adopts the same configuration as in the first phase of operation when the duty cycle is less than 0.5 (shown in FIG. 5a), with the input switch 460 and fourth and fifth switches 448, 452 of the switch network 440 closed (i.e. switched on) in response to suitable control signals from the controller circuitry 490, such that the flying capacitor 410, inductor 430 and output capacitor 420 are is coupled in series between the input node 470 and the ground (or other reference voltage supply) terminal or coupling node, and the flying capacitor 410 and inductor 430 are coupled in series between the input node 470 and the output node 480.

The flying capacitor 410 thus charges up and a voltage of (or close to) VIN/2 develops across the flying capacitor 410. Because the duty cycle is greater than 0.5, the output voltage VOUT at the second terminal of the inductor 430 is greater than VIN/2, and so a decreasing current flows through the inductor 430 to a load (e.g. a battery 150) coupled to the output node 480, and to the output capacitor 420.

Because the output voltage VOUT is greater than the voltage VIN/2 across the flying capacitor 410 in the first phase of operation, if the third switch 446 were implemented as a single MOSFET device with a body diode having an anode coupled to the third node 447 and a cathode coupled to the first node 443 (as shown in FIG. 2), then the body diode of the third switch 446 would conduct in the first phase of operation, thus providing a path for reverse current from a load coupled to the output node 480 to the flying capacitor 410.

To prevent this, if the power converter circuitry 400 is to be operated in the second forward mode as a three-level buck converter with a duty cycle greater than 0.5, the third switch 446 should be implemented as first and second back-to-back connected MOSFET devices 446a, 446b, as shown in FIG. 3. With the third switch 446 implemented in this way, the body diode of the second MOSFET device 446b prevents reverse current flow from the load during the first phase of operation.

Again, it will be noted that no separate flying capacitor is required when the power converter circuitry 400 operates in its second forward mode as three-level inductive buck converter circuitry, because the flying capacitor 410 that is used when the power converter circuitry 400 is operating in its first forward mode as switched capacitor power converter circuitry is also used when the power converter circuitry 400 is operating in its second mode as three-level inductive buck converter circuitry.

Figure 6B:
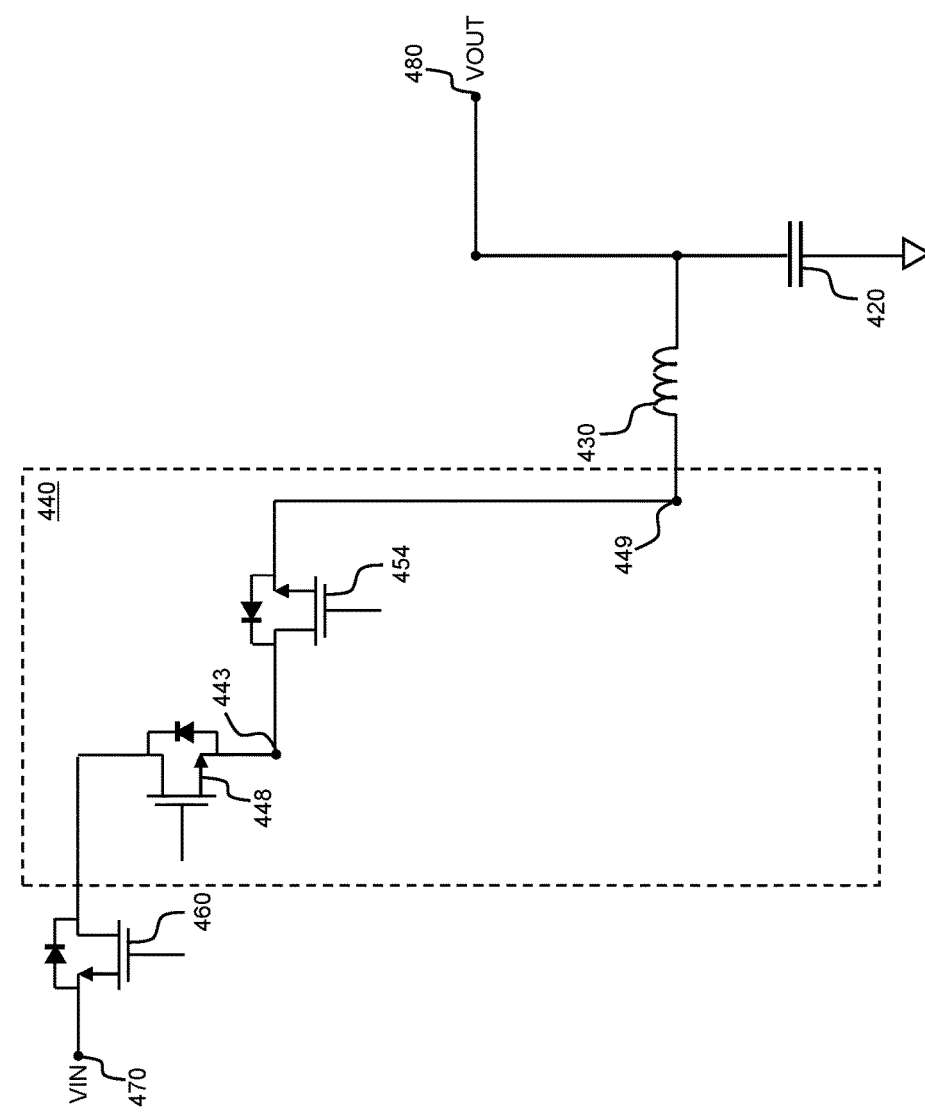
Figure 6B:
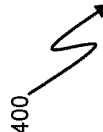

In a second phase of operation, shown in FIG. 6b, the input switch 460 and the fourth and sixth switches 448, 454 of the switch network 440 are closed (i.e. switched on) and the other switches 442-452 opened (i.e. switched off) in response to suitable control signals from the controller circuitry 490, such that the inductor 430 and output capacitor 420 are coupled in series between the input node 470 and the ground (or other reference voltage supply) terminal or node and the inductor 430 is coupled in series between the input node 470 and the output node 480.

With the switch network 440 in this configuration, the input voltage VIN is supplied to the first terminal of the inductor 430, and so an increasing current flows through the inductor 440 to both the output capacitor 420 and to the load that is coupled to the output node 480.

Figure 6C:
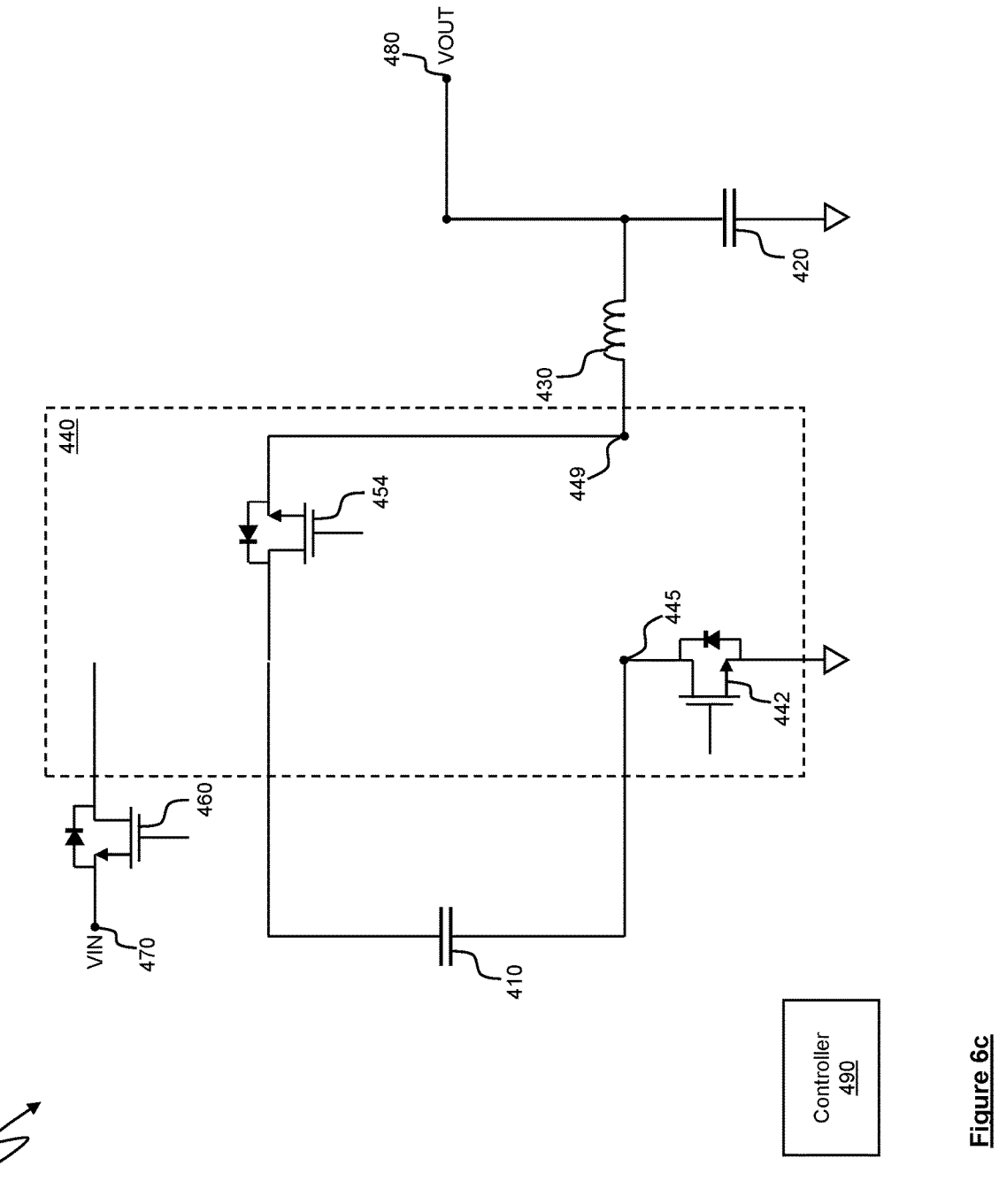

In a third phase of operation, shown in FIG. 6c, the switch network 440 adopts the same configuration as in the third phase of operation when the duty cycle is less than 0.5 (shown in FIG. 5c), with the first and sixth switches 442, 454 of the switch network 440 closed (i.e. switched on) in response to suitable control signals from the controller circuitry 490, such that the flying capacitor 410 and the inductor 430 are coupled in series between the ground (or other reference voltage supply) terminal or node and the output node 480, and the output capacitor 420 is coupled in parallel with the series combination of the flying capacitor 410 and the inductor 430, between the ground (or other reference voltage supply) terminal and the output node 480.

The voltage VIN/2 across the flying capacitor 410 is thus supplied to the first terminal of the inductor 430. Because the output voltage VOUT at the second terminal of the inductor 430 is greater than VIN/2, a decreasing current flows through the inductor 430 to the output node 480 (and to a load connected to the output node).

Figure 6D:
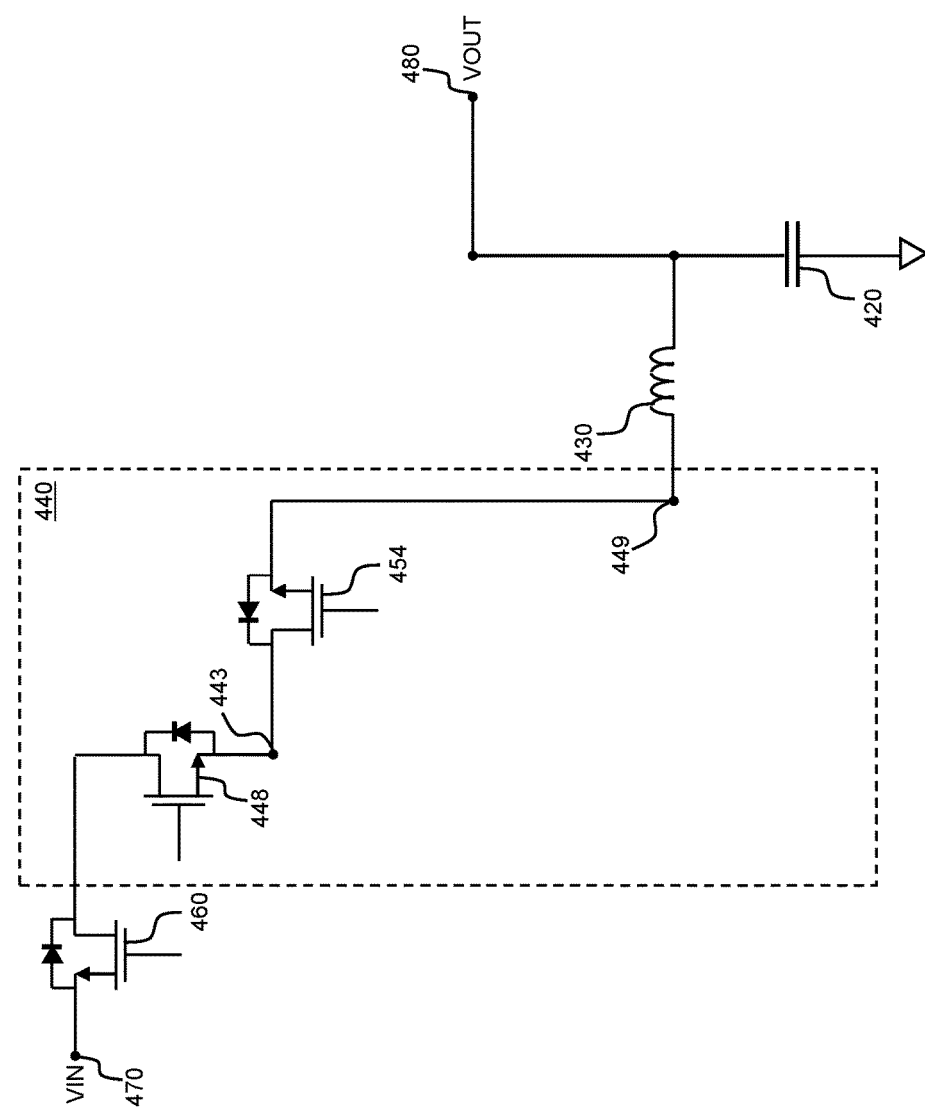
Figure 6D:
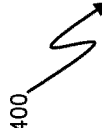

In a fourth phase of operation, shown in FIG. 6*d*, the switch network again adopts the configuration adopted in the second phase, with the fourth and sixth switches 454, 458 being closed (i.e. switched on) and the other switches 442, 444, 446, 452 opened (i.e. switched off) in response to suitable control signals from the controller circuitry 490, such that the inductor 430 and output capacitor 420 are again coupled in series between the input node 470 and the ground (or other reference voltage supply) terminal or node and the inductor 430 is coupled in series between the input node 470 and the output node 480.

With the switch network 440 in this configuration, the input voltage VIN is supplied to the first terminal of the inductor 430, and so an increasing current flows through the inductor 430 to both the output capacitor 420 and to the load that is coupled to the output node 480.

As will be appreciated by those of ordinary skill in the art, over a complete operational cycle (where a complete operational cycle comprises the first to fourth phases of operation) of the power converter circuitry 400 when operating in its second forward mode as forward three-level inductive buck converter circuitry with a duty cycle greater than 0.5, the average output voltage VOUT will be greater than VIN/2.

Figure 7A:
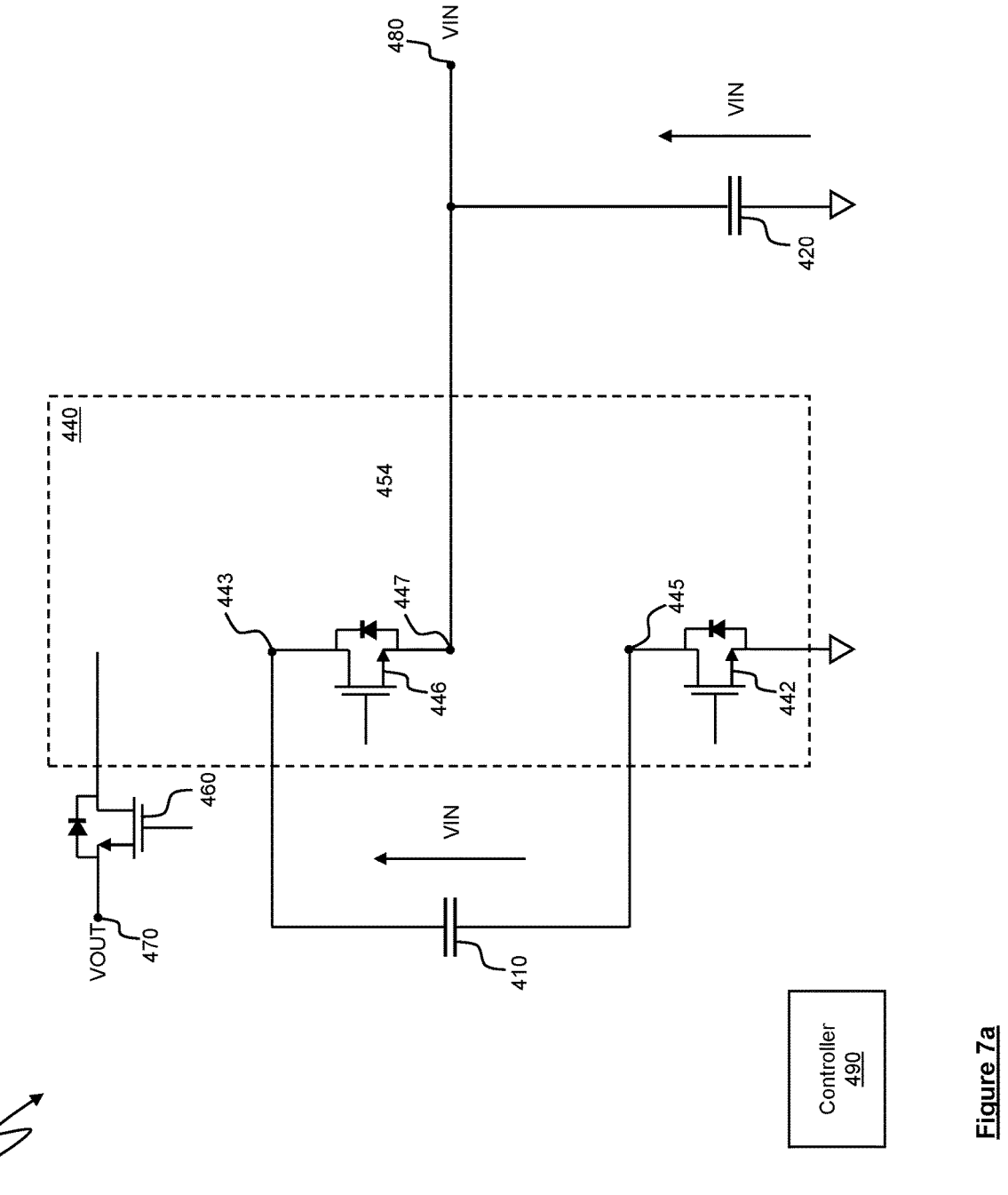
FIGS. 7a-7b illustrate operation of the circuitry of FIG. 2 as a reverse switched capacitor power converter with a 1:2 input voltage to output voltage ratio.
Figure 7B:
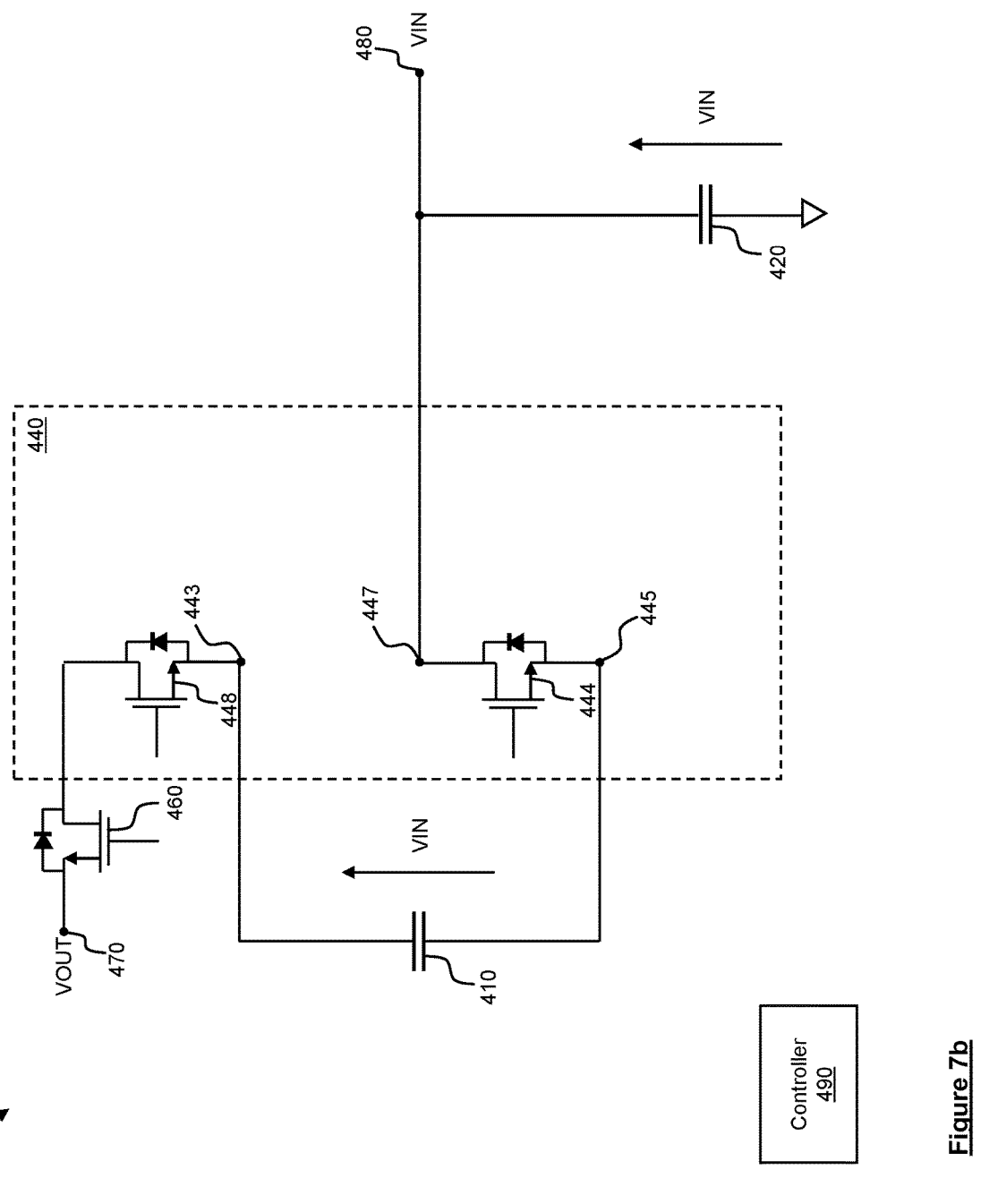

FIGS. 7*a* and 7*b* are schematic diagrams illustrating operation of the power converter circuitry 400 in the first reverse mode, as reverse switched capacitor power converter circuitry with a 1:2 input voltage to output voltage ratio (i.e. a step-up conversion factor of 2) to convert an input voltage VIN received at the output node 480 to a higher output voltage VOUT at the input node 470. In this mode, the power converter circuitry 400 operates with a fixed duty cycle of 0.5.

In a first phase of operation, shown in FIG. 7*a*, the first and third switches 442, 446 are closed (i.e. switched on) and the other switches 444, 448, 452, 454 are opened (i.e. switched off) in response to suitable control signals from the controller circuitry 490.

With the switch network 440 in this configuration, the output capacitor 420 and the flying capacitor 410 are coupled in parallel with each other, between the output node 480 (at which an input voltage VIN is received from an external voltage source such as a battery in this first reverse mode) and the ground (or other reference voltage supply) terminal or coupling node. Thus, in the first phase of operation, the output capacitor 420 and the flying capacitor 410 charge up to the input voltage VIN.

In a second phase of operation, shown in FIG. 7*b*, the second and fourth switches 444, 448 are closed (i.e. switched on) and the other switches 442, 446, 452, 454 are opened (i.e. switched off) in response to suitable control signals from the controller circuitry 490.

With the switch network 440 in this configuration, the output capacitor 420 and the flying capacitor 410 are coupled in series with each other, between the ground (or other reference voltage supply) terminal or coupling node and the input node 470 (at which an output voltage VOUT is supplied, in this first reverse mode), with the output capacitor 420 being coupled in parallel with the external voltage source such as a battery 150.

Thus, in the second phase of operation the output capacitor 420 and the flying capacitor 410 act as additional voltage sources. The flying capacitor 410 acts as an additional voltage source in series with a parallel combination of the external voltage source and the output capacitor 420. The voltage VIN across the parallel combination of the external voltage source and the output capacitor 420 combines with the voltage across the flying capacitor 410 to generate the output voltage VOUT. As the output capacitor 420 and the flying capacitor 410 were both charged to the input voltage VIN during the first phase of operation, the output voltage VOUT at the input node 470 in the second phase of operation is equal to 2VIN.

FIGS. 8*a*-8*d* are schematic diagrams illustrating operation of the power converter circuitry 400 in the second reverse mode as three-level inductive boost converter circuitry with a duty cycle (defined as a ratio of the input voltage to the output voltage) of less than 0.5, such that the output voltage is greater than twice the input voltage. In this mode the power converter circuitry may apply a non-integer step-up conversion factor to the input voltage VIN to generate the output voltage VOUT.

Figure 8A:
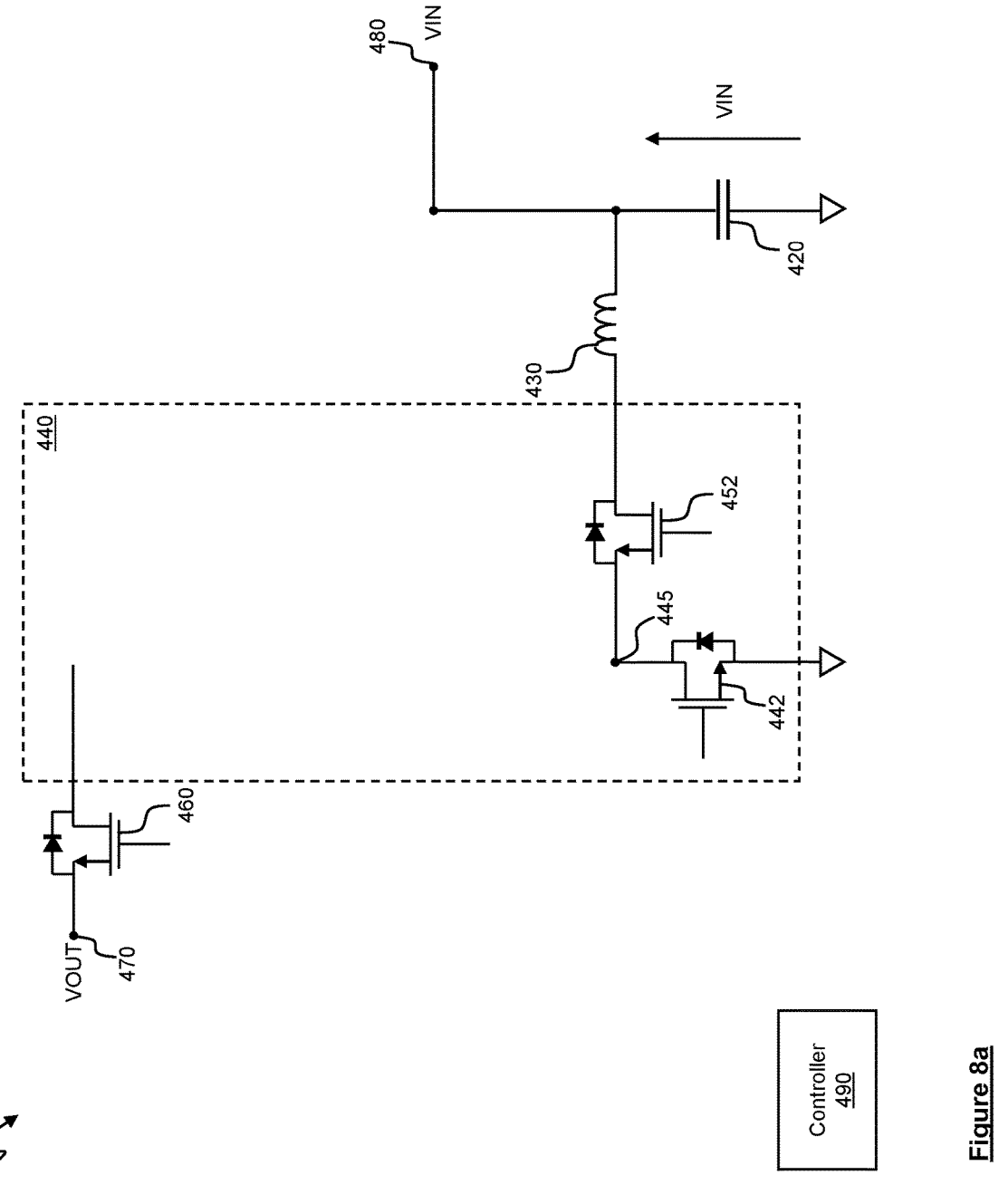
FIGS. 8a-8d illustrate operation of the circuitry of FIG. 2 as a reverse three-level inductive boost converter with a duty cycle of less than 0.5.

In a first phase of operation, shown in FIG. 8*a*, the first and fifth switches 442, 452 are closed (i.e. switched on) and the other switches 444-448, 454 are opened (i.e. switched off) in response to suitable control signals from the controller circuitry 490.

With the switch network 440 in this configuration, the output capacitor 420 and the inductor 430 are coupled in parallel between the output node 480 (at which an input voltage VIN is received from an external voltage source such as a battery in this second reverse mode of operation) and the ground (or other reference voltage supply) terminal or node.

The input voltage VIN thus appears across the output capacitor 420 and the inductor 430, causing the output capacitor 420 to charge up to VIN and an increasing current to flow through the inductor 430.

Figure 8B:
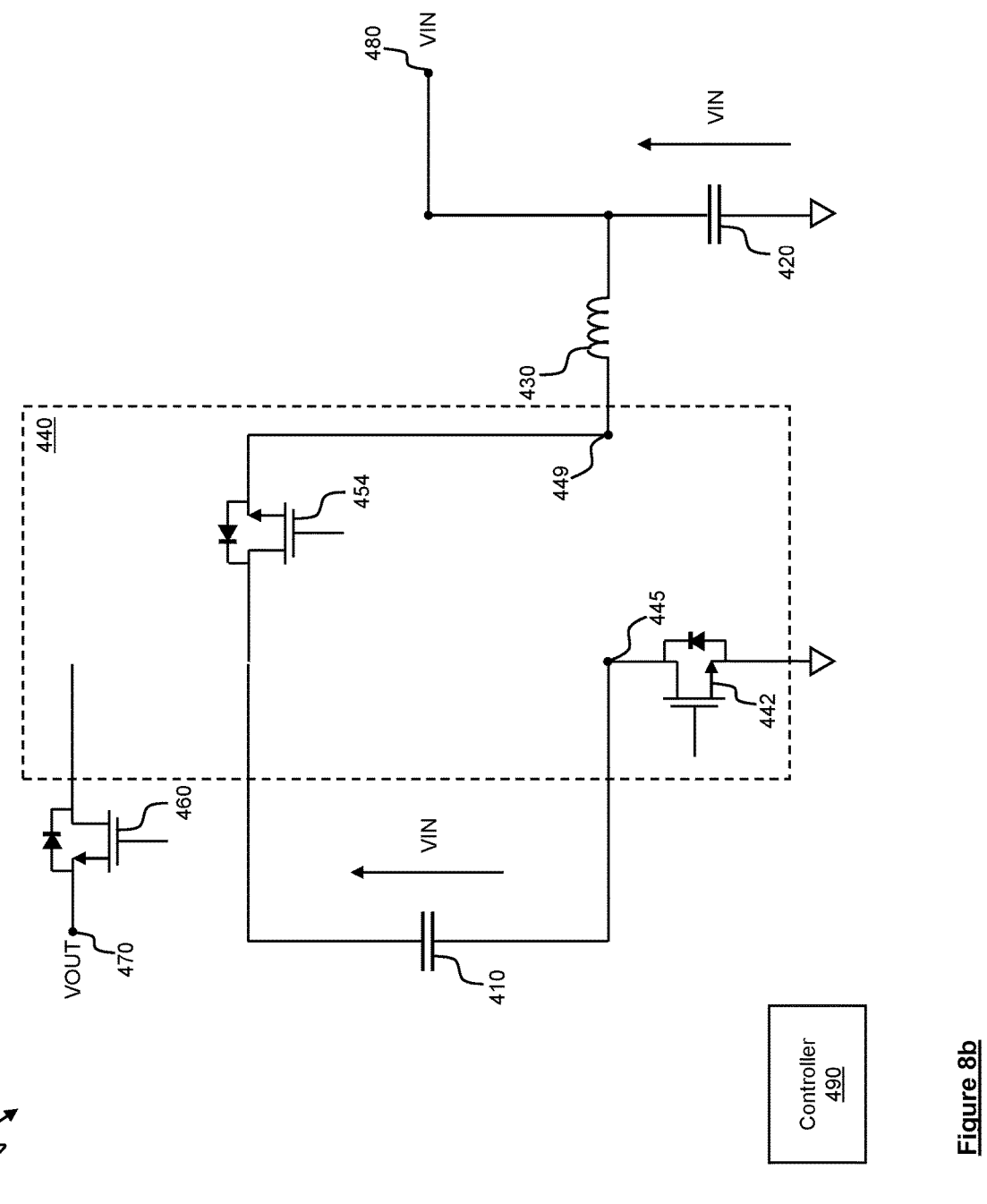

In a second phase of operation, shown in FIG. 8*b*, the first and sixth switches 442, 454 are closed (i.e. switched on) and the other switches 444-448, 452 are opened (i.e. switched off) in response to suitable control signals from the controller circuitry 490.

With the switch network 440 in this configuration, the inductor 430 and the flying capacitor 410 are coupled in series between the output node 480 and the ground (or other reference voltage supply) terminal or coupling node, and the output capacitor 420 is coupled between the output node 480 and the ground (or other reference voltage supply) terminal or coupling node, in parallel with the series combination of the inductor 430 and the flying capacitor 410.

The input voltage VIN thus appears across the output capacitor 420 and series combination of the inductor 430 and the flying capacitor 410, maintaining the voltage of the output capacitor 420 at VIN and also causing an increasing current to flow through the inductor 430 and charging up the flying capacitor 410 to VIN.

Figure 8C:
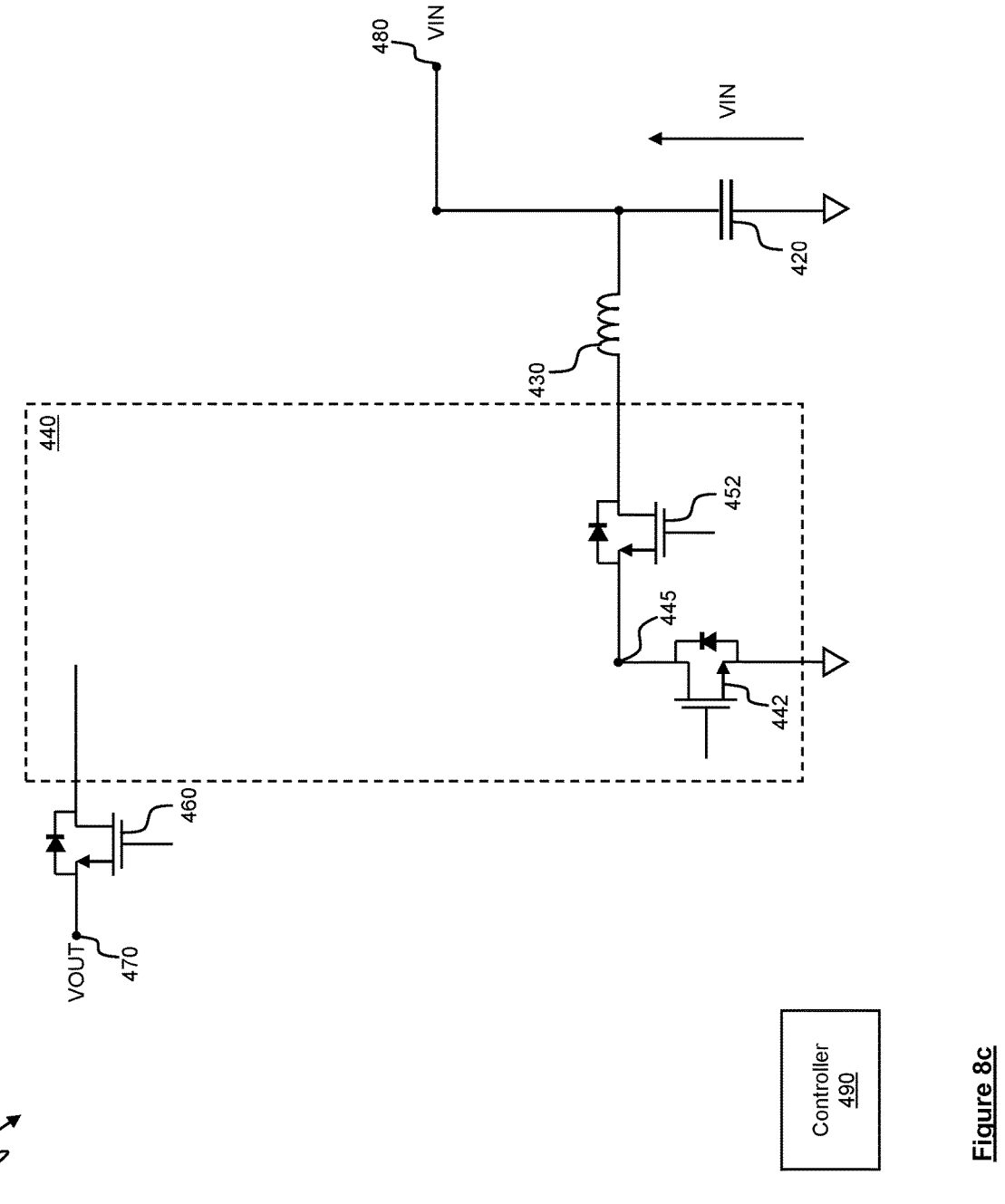

In a third phase of operation, shown in FIG. 8*c*, the switch network 440 again adopts the configuration used in the first phase, with the first and fifth switches 442, 452 being closed (i.e. switched on) and the other switches 444-448, 454 being opened (i.e. switched off) in response to suitable control signals from the controller circuitry 490.

With the switch network 440 in this configuration, the output capacitor 420 and the inductor 430 are again coupled in parallel between the output node 480 and the ground (or other reference voltage supply) terminal or node.

The input voltage VIN thus appears across the output capacitor 420 and the inductor 430, maintaining the voltage of the output capacitor 420 at VIN and causing an increasing current to flow through the inductor 430.

Figure 8D:
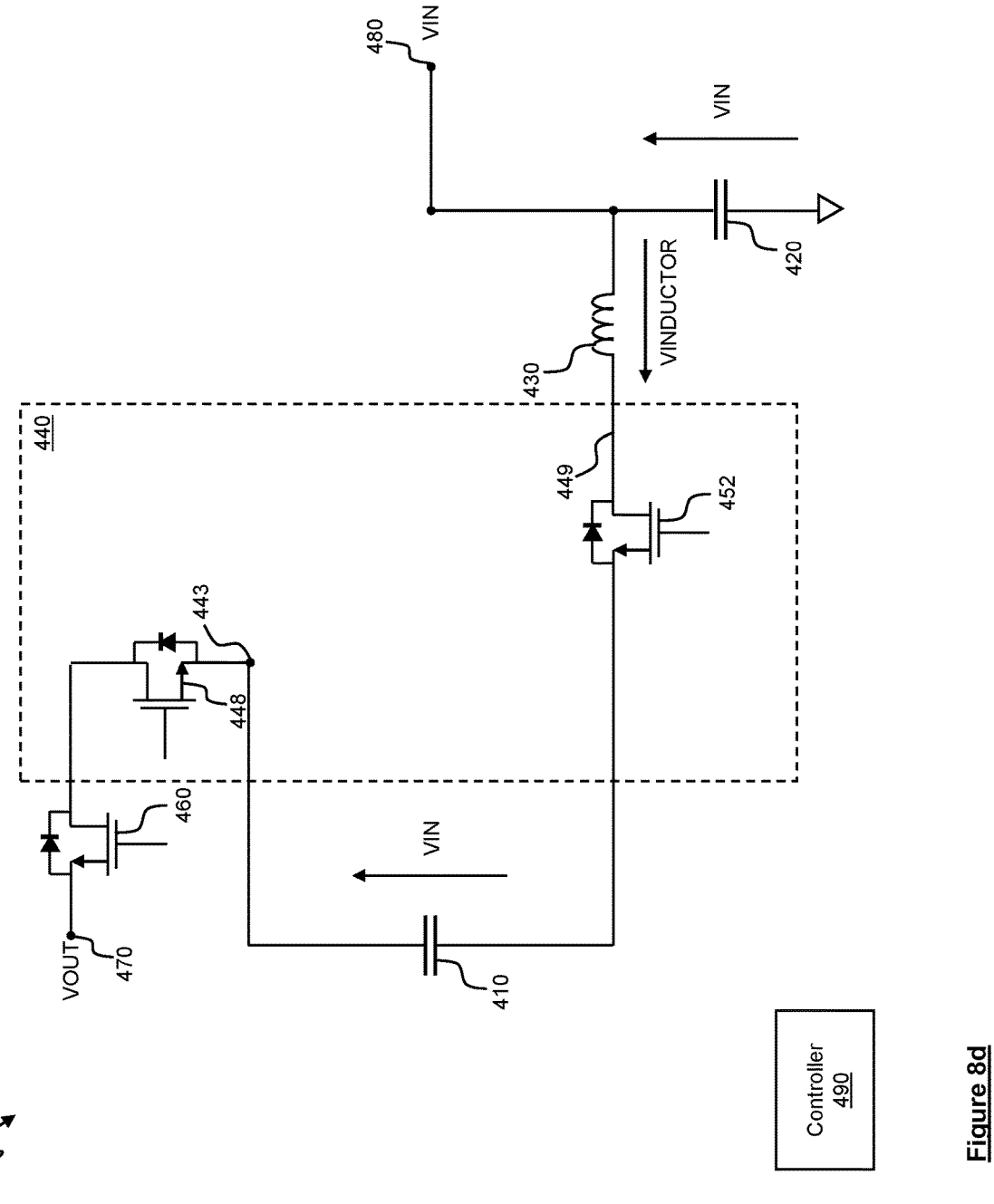

In a fourth phase of operation, shown in FIG. 8d, the fourth and fifth switches 448, 452 are closed (i.e. switched on) and the other switches 442-446 and 454 are opened (i.e. switched off) in response to suitable control signals from the controller circuitry 490. The input switch 460 is also closed (i.e. switched on) in response to a suitable control signal from the controller circuitry 490.

With the switch network 440 in this configuration, the inductor 430 and the flying capacitor 410 are coupled in series between the output node 480 and the input node 470, and the output capacitor 420 is coupled between the output node 480 and the ground (or other reference voltage supply) terminal or node.

Thus, in the fourth phase of operation, the output capacitor 420 acts as an additional voltage source in parallel with the external voltage source (e.g. battery) that is coupled to the output node 480, and the inductor 430 and flying capacitor 410 act as additional voltage sources in series with the external voltage source. Thus, an output voltage VOUT, which is a combination of the input voltage VIN (from the parallel combination of the external voltage source and the output capacitor 420), the voltage VIN across the flying capacitor 410 and a voltage VINDUCTOR across the inductor 430 (which is dependent upon the duty cycle of the power converter circuitry 400) is supplied at the input node 470. VOUT is therefore equal to 2VIN+VINDUCTOR.

FIGS. 9a-9d are schematic diagrams illustrating operation of the power converter circuitry 400 in the second reverse mode as three-level inductive boost converter circuitry with a duty cycle (defined as a ratio of the input voltage to the output voltage) greater than 0.5, such that the output voltage is less than twice the input voltage. In this mode the power converter circuitry may apply a non-integer step-up conversion factor to the input voltage VIN to generate the output voltage VOUT.

Figure 9A:
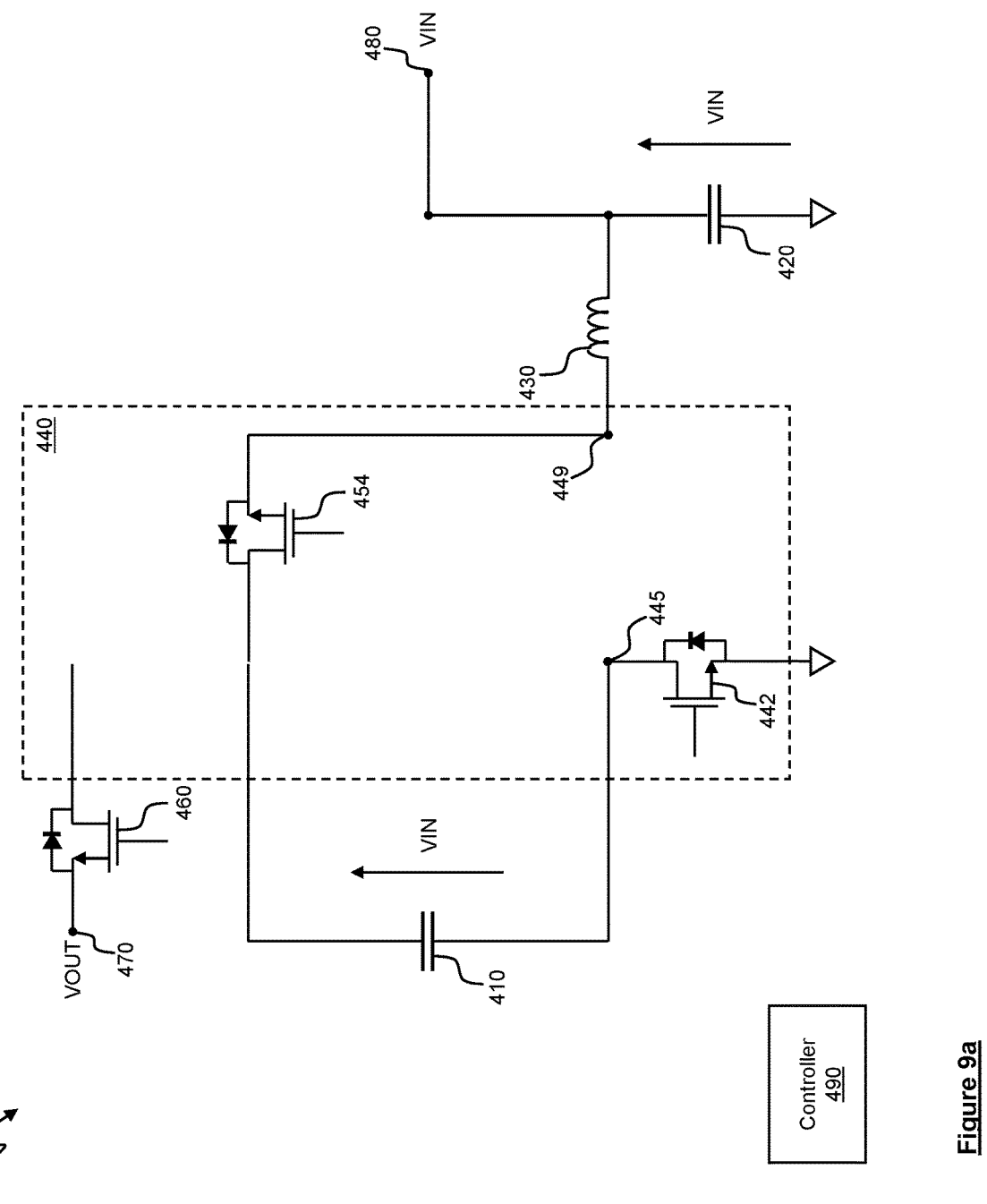
FIGS. 9a-9d illustrate operation of the circuitry of FIG. 2 as a reverse three-level inductive boost converter with a duty cycle greater than 0.5.

In a first phase of operation, shown in FIG. 9a, the first and sixth switches 442, 454 are closed (i.e. switched on) and the other switches 444, 446, 448, 452 are opened (i.e. switched off) in response to suitable control signals from the controller circuitry 490.

With the switch network 440 in this configuration, the inductor 430 and the flying capacitor 410 are coupled in series between the output node 480 (at which an input voltage VIN is received from an external voltage source such as a battery is coupled, in this second reverse mode of operation) and the ground (or other reference voltage supply) terminal or coupling node, and the output capacitor 420 is coupled between the output node 480 and the ground (or other reference voltage supply) terminal or coupling node, in parallel with the series combination of the inductor 430 and the flying capacitor 410.

The input voltage VIN thus appears across the output capacitor 420 and the series combination of the inductor 430 and the flying capacitor 410, causing the output capacitor 420 and the flying capacitor 410 to charge up to VIN, and causing an increasing current to flow through the inductor 430.

Figure 9B:
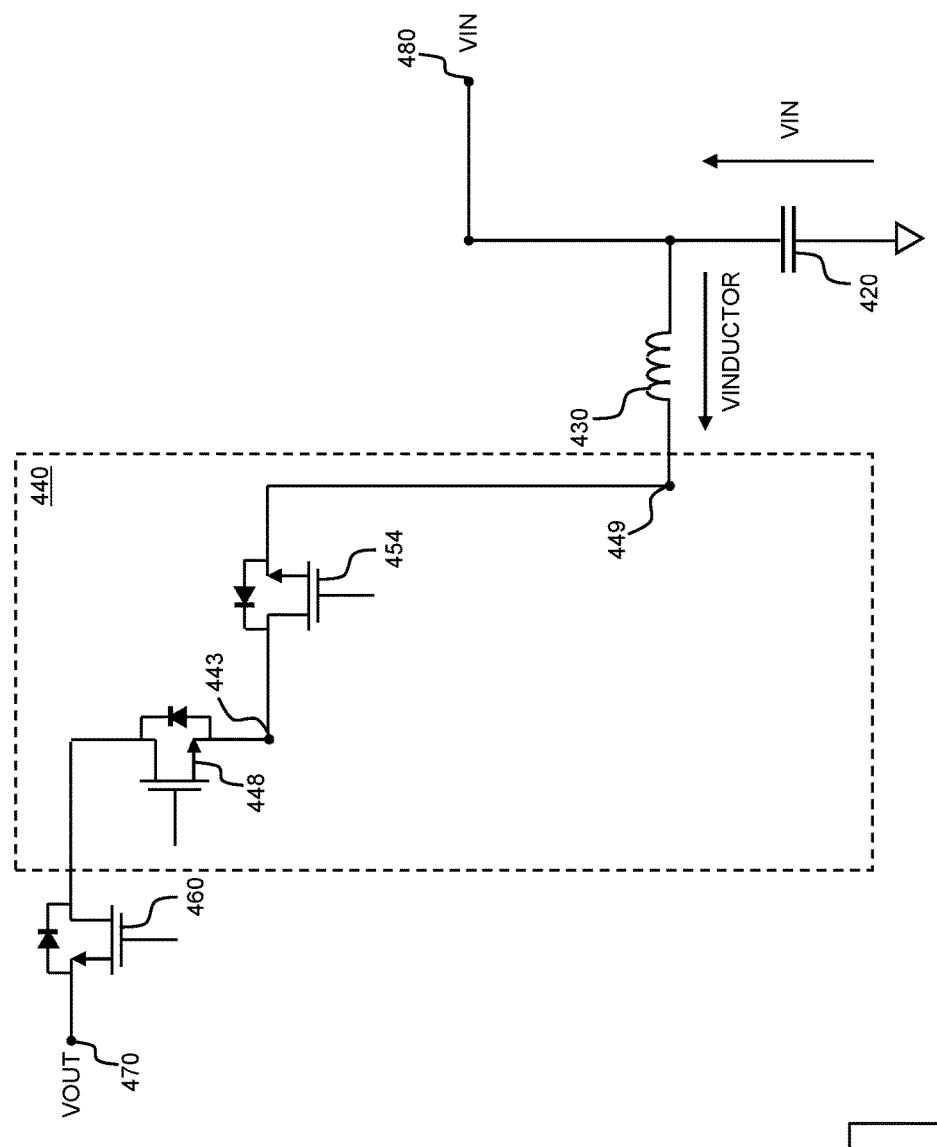

In a second phase of operation, shown in FIG. 9b, the fourth and sixth switches 448, 454 are closed (i.e. switched on) and the other switches 442-446 and 452 are opened (i.e. switched off) in response to suitable control signals from the controller circuitry 490.

With the switch network 440 in this configuration, the inductor 430 is coupled in series between the output node 480 and the input node 470, and the output capacitor 420 is coupled between the output node 480 and the ground (or other reference voltage supply) terminal or coupling node.

The inductor 430 thus acts as an additional voltage source in series with the external voltage source, such that an output voltage VOUT equal to VIN+VINDUCTOR (where VINDUCTOR is a duty cycle dependent voltage across the inductor 430 in the second phase of operation) is supplied to the input node 470.

Figure 9C:
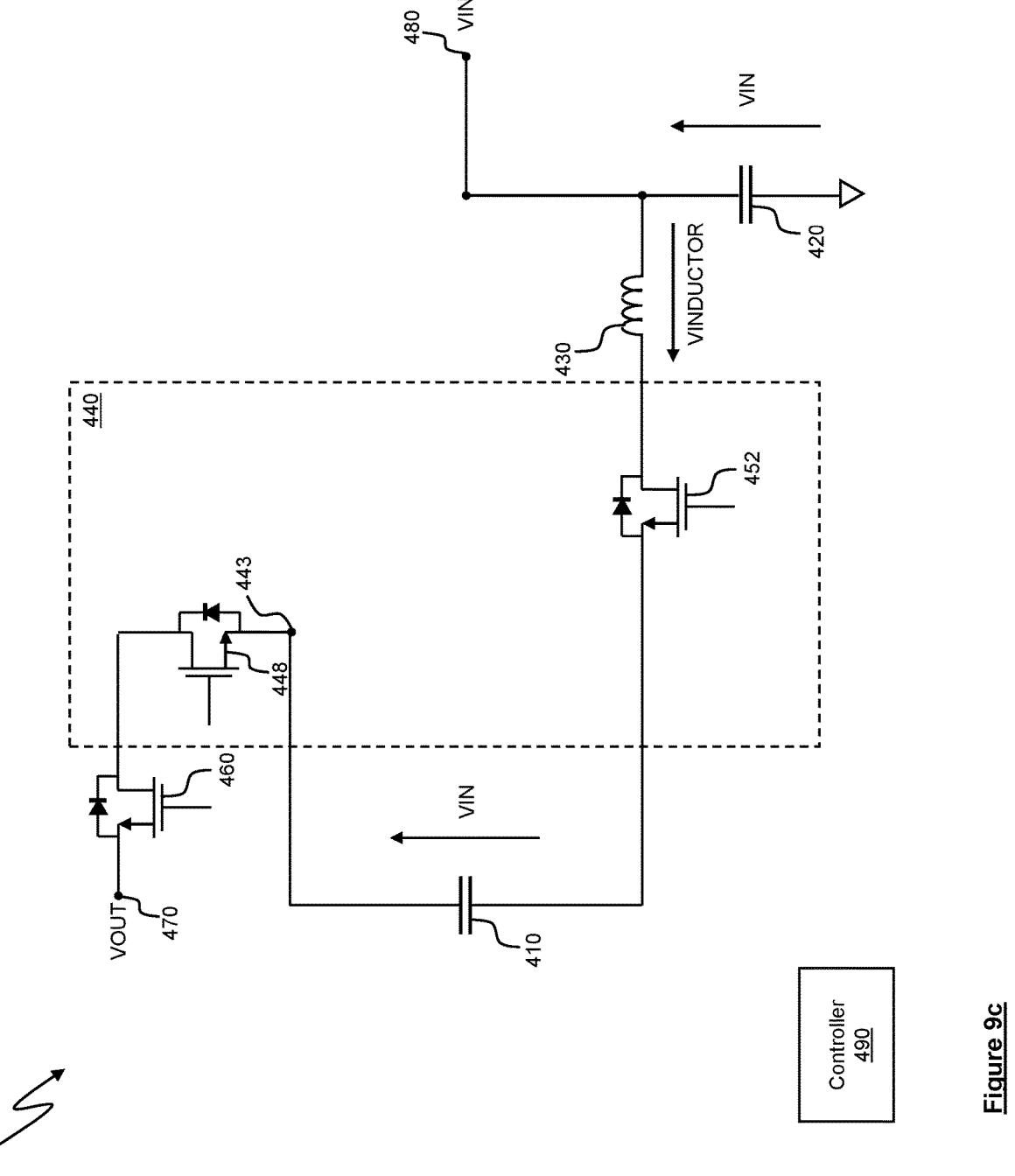

In a third phase of operation, shown in FIG. 9c, the fourth and fifth switches 448, 452 are closed (i.e. switched on) and the other switches 442-446 and 454 are opened (i.e. switched off) in response to suitable control signals from the controller circuitry 490. The input switch 460 is also closed (i.e. switched on) in response to a suitable control signal from the controller circuitry 490.

With the switch network 440 in this configuration, the inductor 430 and the flying capacitor 410 are coupled in series between the output node 480 and the input node 470, and the output capacitor 420 is coupled between the input node 480 and the ground (or other reference voltage supply) terminal or coupling node.

Thus, in the third phase of operation, the output capacitor 420 acts as an additional voltage source in parallel with the external voltage source (e.g. battery) that is coupled to the output node 480, and the inductor 430 and flying capacitor 410 act as additional voltage sources in series with the external voltage source. Thus, an output voltage VOUT, which is a combination of the input voltage VIN (from the parallel combination of the external voltage source and the output capacitor 420), the voltage VIN across the flying capacitor 410 and a voltage VINDUCTOR across the inductor 430 (which is dependent upon the duty cycle of the power converter circuitry 400) is supplied at the input node 470. VOUT is therefore equal to 2VIN+VINDUCTOR.

Figure 9D:
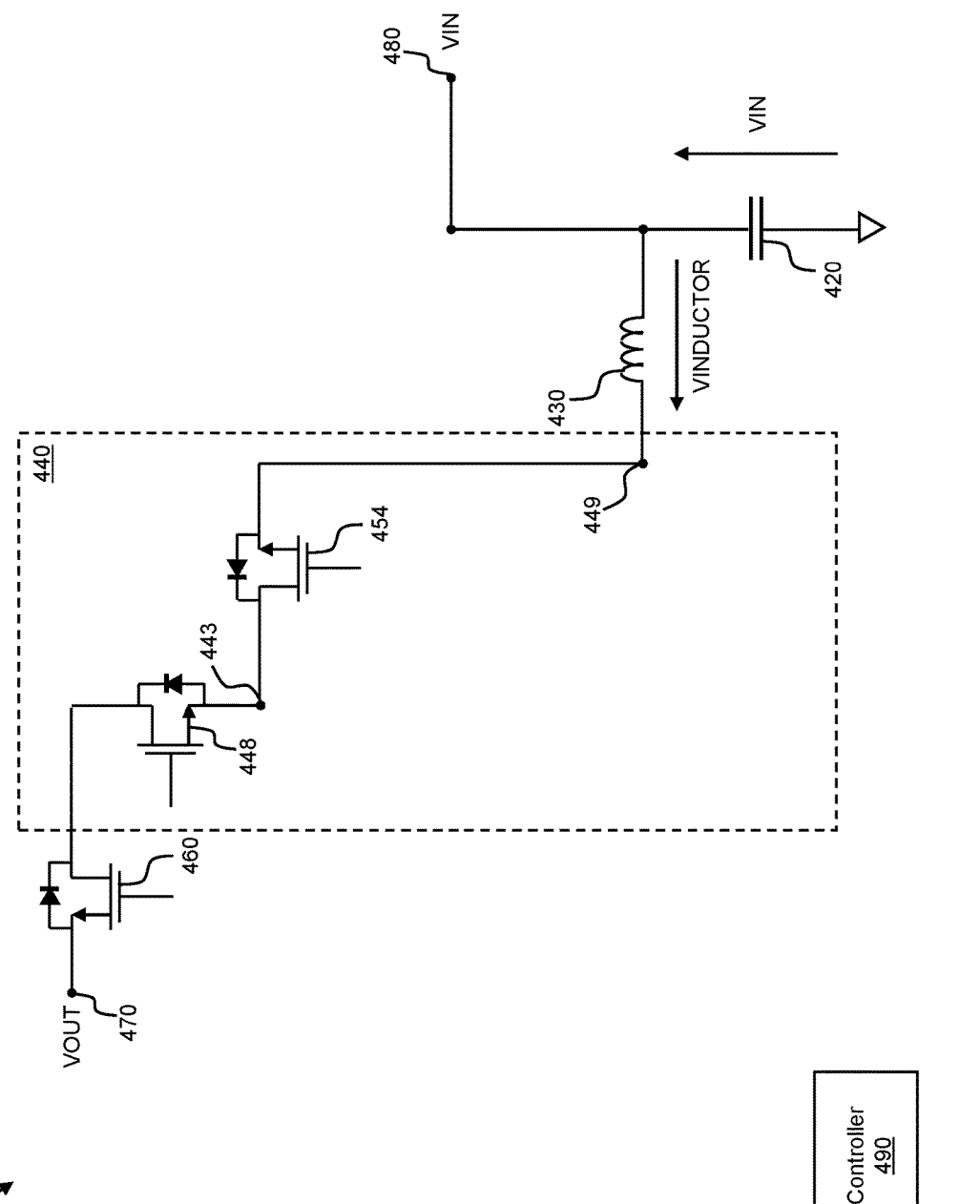

In a fourth phase of operation, shown in FIG. 9d, the switch network 440 adopts the same configuration as in the second phase, with the fourth and sixth switches 448, 454 being closed (i.e. switched on) and the other switches 442-446 and 452 being opened (i.e. switched off) in response to suitable control signals from the controller circuitry 490.

With the switch network 440 in this configuration, the inductor 430 is again coupled in series between the output node and the input node 470, and the output capacitor 420 is coupled between the output node 480 and the ground (or other reference voltage supply) terminal or node.

The inductor 430 thus again acts as an additional voltage source in series with the external voltage source, such that an output voltage VOUT equal to VIN+VINDUCTOR (where VINDUCTOR is a duty cycle dependent voltage across the inductor in the second phase of operation) is supplied to the input node 470.

As will be apparent from the foregoing discussion, the power converter circuitry 400 of the present disclosure provides a single circuit that can operate in forward switched capacitor converter and inductive buck converter modes to generate a reduced output voltage from an input voltage. Thus, the circuitry 400 of the present disclosure can support the charging modes required in a charging system of the kind described above with respect to FIG. 1 in a single circuit, such that separate switched capacitor circuitry and inductive buck converter circuitry is not required. Accordingly, the present disclosure extends to a charging system comprising the circuitry 400.

By providing a single circuit that is operable in forward switched capacitor converter and inductive buck converter modes, a reduction in the number of switches and capacitors that are required can be achieved, compared to a system that uses separate switched capacitor circuitry and inductive buck converter circuitry. Additionally, the combined switched capacitor and inductive buck converter circuitry of the present disclosure can be implemented in a single integrated circuit.

Furthermore, the power converter circuitry 400 of the present disclosure is also operable in reverse switched capacitor converter and inductive boost converter modes to generate an increased output voltage from an input voltage.

In the foregoing description the use of a third 446 switch implemented as back-to-back connected MOSFET devices to prevent reverse current from a load coupled to the output node 480 to the flying capacitor 410 when the power converter circuitry 400 is operating in the second forward mode as a three-level buck converter with a duty cycle greater than 0.5 is discussed. Those of ordinary skill in the art will readily appreciate that preventing reverse current may be desirable in other modes of operation. Thus, as discussed above, the second switch 444, and/or the fifth switch 452 and/or the sixth switch 454 may also be implemented as two back-to-back connected MOSFET devices, as shown in FIG. 3, to prevent undesirable current flow when the power converter circuitry 400 is operating in other modes.

The circuitry described above with reference to the accompanying drawings may be incorporated in a host device such as a laptop, notebook, netbook or tablet computer, a gaming device such as a games console or a controller for a games console, a virtual reality (VR) or augmented reality (AR) device, a mobile telephone, a portable audio player or some other portable device, or may be incorporated in an accessory device for use with a laptop, notebook, netbook or tablet computer, a gaming device, a VR or AR device, a mobile telephone, a portable audio player or other portable device.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A power converter integrated circuit comprising:
a switch network having coupling nodes for coupling the switch network to:
a single flying capacitor;
an output capacitor; and
an inductor,
wherein the power converter integrated circuit is operable in a first forward mode as switched capacitor power converter circuitry using only the switch network, the single flying capacitor and the output capacitor and in a second forward mode as inductive converter circuitry using the switch network, the single flying capacitor, the output capacitor and the inductor, wherein:
in the first forward mode, the switch network is operative to:
couple the single flying capacitor and the output capacitor in series in a first phase of operation; and
couple the single flying capacitor and the output capacitor in parallel in a second phase of operation; and
in the second forward mode, the switch network is operative to:
couple the single flying capacitor, the inductor and the output capacitor in series in a phase of operation; and
couple a series combination of the single flying capacitor and the inductor in parallel with the output capacitor in a subsequent phase of operation.

2. The power converter integrated circuit of claim 1, wherein the switch network is operable with a fixed duty cycle of 0.5 in the first forward mode.

3. A battery charging system comprising the power converter integrated circuit of claim 1.

4. A host device comprising the power converter integrated circuit of claim 1, wherein the host device comprises a laptop, notebook, netbook or tablet computer, a gaming device, a games console, a controller for a games console, a virtual reality (VR) or augmented reality (AR) device, a mobile telephone, a portable audio player, a portable device, an accessory device for use with a laptop, notebook, netbook or tablet computer, a gaming device, a games console, a VR or AR device, a mobile telephone, a portable audio player or other portable device.

5. The power converter integrated circuit of claim 1, wherein the switch network is operable with a duty cycle of less than 0.5 in the second forward mode.

6. The power converter integrated circuit of claim 5, wherein the switch network is operative to couple the inductor in parallel with the output capacitor in a further phase of operation.

7. The power converter integrated circuit of claim 1, wherein the switch network is operable with a duty cycle greater than 0.5 in the second forward mode.

8. The power converter integrated circuit of claim 7, wherein the switch network is operative to couple the inductor in series with the output capacitor in a further phase of operation.

9. The power converter integrated circuit of claim 1, wherein the power converter integrated circuit is operable in a first reverse mode as switched capacitor converter circuitry and in a second reverse mode as inductive boost converter circuitry.

10. The power converter integrated circuit of claim 9, wherein in operation of the power converter integrated circuit in the first reverse mode, the switch network is operative to:
couple the flying capacitor and the output capacitor in parallel in a first phase of operation; and
couple the flying capacitor and the output capacitor in series in a second phase of operation.

11. The power converter integrated circuit of claim 10, wherein in operation of the power converter integrated circuit in the first reverse mode, the switch network is operative to:
couple the flying capacitor and the output capacitor in parallel between an output node of the power converter integrated circuit and a reference voltage supply node in the first phase of operation; and
couple the flying capacitor between the output node and an input node of the power converter integrated circuitry and couple the output capacitor between the output node and the reference voltage supply node in the second phase of operation.

12. The power converter integrated circuit of claim 11, wherein the switch network is operable with a fixed duty cycle of 0.5 in the first reverse mode.

13. The power converter integrated circuit of claim 9, wherein in operation of the power converter integrated circuit in the second reverse mode, the switch network is operative to:
couple a series combination of the flying capacitor and the inductor in parallel with the output capacitor in a phase of operation; and
couple the output capacitor, the inductor and the flying capacitor in series in a subsequent phase of operation.

14. The power converter integrated circuit of claim 13, wherein the switch network is operable with a duty cycle of less than 0.5 in the second reverse mode.

15. The power converter integrated circuit of claim 14, wherein the switch network is operative to couple the inductor in parallel with the output capacitor in a subsequent phase of operation.

16. The power converter integrated circuit of claim 13, wherein the switch network is operable with a duty cycle greater than 0.5 in the second reverse mode.

17. The power converter integrated circuit of claim 16, wherein the switch network is operative to couple the inductor in series with the output capacitor in a subsequent phase of operation.

18. The power converter integrated circuit of claim 1, wherein the switch network comprises first to sixth switches, and wherein, in use of the power converter integrated circuit:
the first switch is coupled between a reference voltage supply node of the switch network and the second switch;
the second switch is coupled between the first switch and the third switch;
the third switch is coupled between the second switch and the fourth switch;
the fourth switch is coupled between the third switch and a switch network input node;
the fifth switch is coupled between a first switch network node and a first terminal of the inductor;
the sixth switch is coupled between a second switch network node and the first terminal of the inductor;

a second terminal of the inductor is coupled to an output node of the power converter integrated circuit;

the output capacitor is coupled to the output node of the power converter integrated circuit;

a first terminal of the flying capacitor is coupled to the first switch network node between the third and fourth switches; and a second terminal of the flying capacitor is coupled to the second switch network node between the first and second switches.

19. The power converter integrated circuit of claim 18, wherein the second switch and/or the third switch and/or the fifth switch and/or the sixth switch comprises a first MOS-FET device and a second MOSFET device, wherein a source terminal of the first MOSFET device is coupled to a source terminal of the second MOSFET device such that an anode of a body diode of the first MOSFET device is coupled to an anode of a body diode of the second MOSFET device.

20. The power converter integrated circuit of claim 18, further comprising an input switch coupled between an input node of the power converter integrated circuit and the fourth switch.

* * * * *